United States Patent
Seo et al.

(10) Patent No.: US 9,225,450 B2
(45) Date of Patent: Dec. 29, 2015

(54) METHOD AND APPARATUS FOR MEASUREMENT FOR INTER-CELL INTERFERENCE COORDINATION IN RADIO COMMUNICATION SYSTEM

(71) Applicant: LG ELECTRONICS INC., Seoul (KR)

(72) Inventors: Inkwon Seo, Anyang-si (KR); Hanbyul Seo, Anyang-si (KR); Byounghoon Kim, Anyang-si (KR); Kijun Klm, Anyang-si (KR); Hakseong Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/531,719

(22) Filed: Nov. 3, 2014

(65) Prior Publication Data

US 2015/0055502 A1 Feb. 26, 2015

Related U.S. Application Data

(63) Continuation of application No. 13/509,748, filed as application No. PCT/KR2011/002155 on Mar. 29, 2011.

(60) Provisional application No. 61/446,033, filed on Feb.
(Continued)

(51) Int. Cl.
*H04J 11/00* (2006.01)
*H04W 24/08* (2009.01)
(Continued)

(52) U.S. Cl.
CPC .......... *H04J 11/0056* (2013.01); *H04L 5/0073* (2013.01); *H04W 24/00* (2013.01);
(Continued)

(58) Field of Classification Search
CPC . H04J 11/0056; H04J 13/0062; H04W 24/00; H04W 24/08; H04W 28/04; H04W 48/16; H04W 92/02; H04L 5/0073; H04L 5/0048; H04L 5/0053; H04L 5/0091; H04L 5/0023
See application file for complete search history.

(56) References Cited

U.S. PATENT DOCUMENTS 6,643,517 B1 11/2003 Steer
2007/0105583 A1 5/2007 Gerlach
(Continued)

FOREIGN PATENT DOCUMENTS

CN 101111054 A 1/2008
CN 101400127 A 4/2009
(Continued)

OTHER PUBLICATIONS

3GPP TSG-RAN WG1 Meeting #57, "Some Consideration on Positioning Function in LTE R9", ZTE, San Francisco, USA, May 4-8, 2009, 5 pages. R1-092176.
(Continued)

*Primary Examiner* — Brian D Nguyen
(74) *Attorney, Agent, or Firm* — Birch, Stewart, Kolasch & Birch, LLP

(57) ABSTRACT

A method for supporting measurement of a User Equipment (UE) by a first base station in a wireless communication system. The method according to an embodiment includes acquiring, by the first base station, information of a downlink subframe configuration of a second base station; and transmitting, by the first base station, information of measurement objects to the UE. The measurement objects are determined based on the downlink subframe configuration of the second base station. A measurement is performed by the UE in resources indicated based on the information of the measurement objects. The resources are determined as a combination of at least one Orthogonal Frequency Division Multiplexing (OFDM) symbol and at least one downlink subframe. The downlink subframe configuration of the second base station includes information indicating at least one subframe configured as an Almost Blank Subframe (ABS).

10 Claims, 21 Drawing Sheets

Related U.S. Application Data 23, 2011, provisional application No. 61/405,215, filed on Oct. 21, 2010, provisional application No. 61/379,741, filed on Sep. 3, 2010, provisional application No. 61/318,758, filed on Mar. 29, 2010.

(51) Int. Cl.
*H04W 24/00* (2009.01)
*H04J 13/00* (2011.01)
*H04W 48/16* (2009.01)
*H04W 92/20* (2009.01)
*H04L 5/00* (2006.01)

(52) U.S. Cl.
CPC ........... *H04W 24/08* (2013.01); *H04J 13/0062* (2013.01); *H04L 5/0023* (2013.01); *H04L 5/0048* (2013.01); *H04L 5/0053* (2013.01); *H04L 5/0091* (2013.01); *H04W 48/16* (2013.01); *H04W 92/20* (2013.01)

(56) References Cited

U.S. PATENT DOCUMENTS

| | | | |
|---|---|---|---|
| 2009/0175179 A1 | 7/2009 | Stewart et al. | |
| 2009/0252077 A1* | 10/2009 | Khandekar et al. | 370/312 |
| 2009/0275326 A1 | 11/2009 | Lee et al. | |
| 2010/0040000 A1 | 2/2010 | Jang et al. | |
| 2010/0248697 A1* | 9/2010 | Pedersen et al. | 455/414.1 |
| 2010/0267338 A1* | 10/2010 | Chiu et al. | 455/63.1 |
| 2011/0026473 A1 | 2/2011 | Luo et al. | |
| 2011/0044259 A1 | 2/2011 | Nimbalker et al. | |
| 2011/0045831 A1* | 2/2011 | Chiu et al. | 455/436 |
| 2011/0081865 A1* | 4/2011 | Xiao et al. | 455/63.1 |
| 2011/0149879 A1* | 6/2011 | Noriega et al. | 370/329 |
| 2011/0149894 A1 | 6/2011 | Luo et al. | |
| 2011/0188481 A1 | 8/2011 | Damnjanovic et al. | |
| 2011/0194423 A1* | 8/2011 | Cho et al. | 370/252 |
| 2011/0200126 A1* | 8/2011 | Bontu et al. | 375/260 |
| 2011/0218016 A1 | 9/2011 | Hirakawa et al. | |
| 2011/0222504 A1 | 9/2011 | Ma et al. | |
| 2012/0099547 A1 | 4/2012 | Wan et al. | |
| 2012/0147810 A1 | 6/2012 | Wang et al. | |
| 2012/0320882 A1 | 12/2012 | Sankar et al. | |
| 2013/0210433 A1 | 8/2013 | Lee et al. | |

FOREIGN PATENT DOCUMENTS

| | | |
|---|---|---|
| JP | 2013-517661 A | 5/2013 |
| KR | 10-2009-0037636 A | 4/2009 |
| KR | 10-2010-0020581 A | 2/2010 |
| WO | WO 2010/032791 A1 | 3/2010 |
| WO | WO 2011/000302 A1 | 1/2011 |
| WO | WO 2011/087252 A2 | 7/2011 |

OTHER PUBLICATIONS

3GPP TSG-RAN WG3 Meeting #53, "Options for Inter-Cell Interference Coordination (ICIC)", Ericsson, Tallinn, Estonia, Aug. 28-Sep. 1, 2006, 5 pages. R3-061199.

3GPP TSG-RAN WG3 Meeting #60, "Inter-Cell CSI-RS Design and Inter-Cell Measurement Consideration", LG Electronics, San Francisco, USA, Feb. 22-26, 2010, 4 pages. R1-101550.

\* cited by examiner

FIG. 6
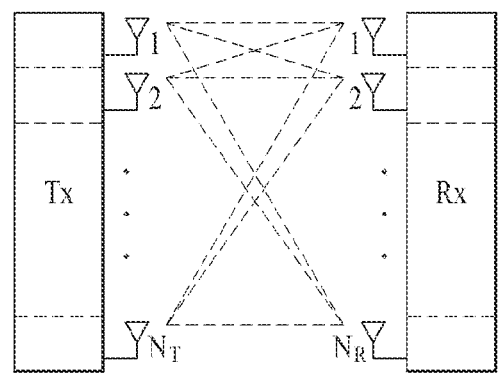
(a)
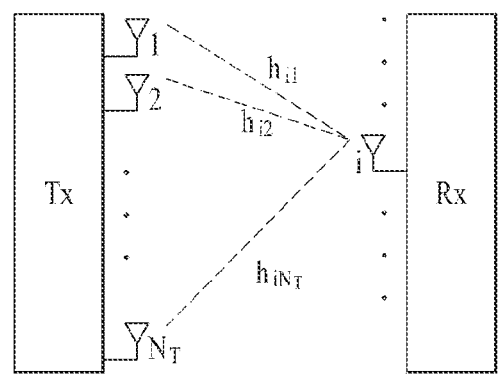
(b)

FIG. 7
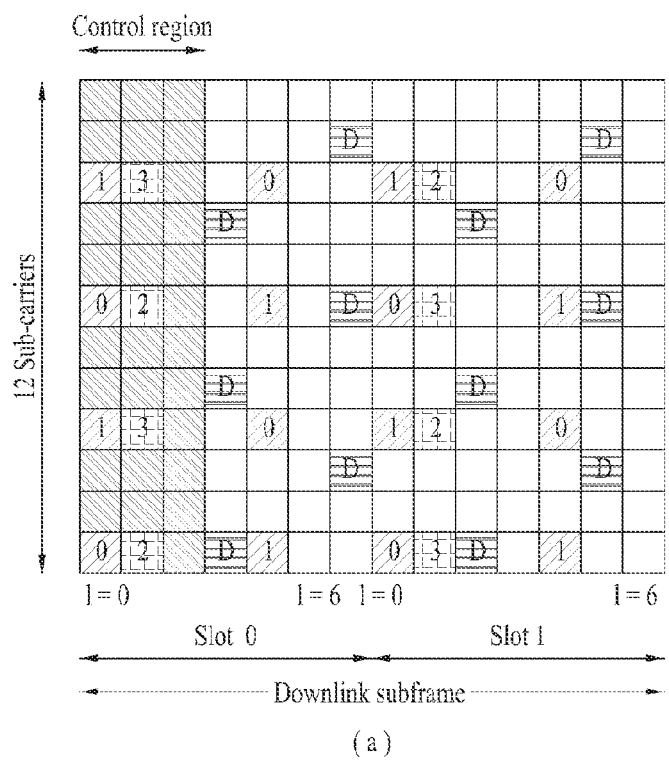
(a)
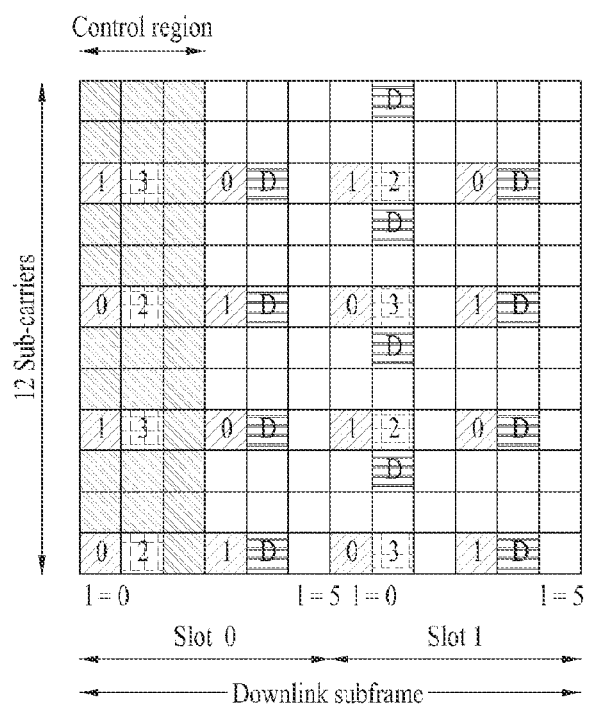
(b)

METHOD AND APPARATUS FOR MEASUREMENT FOR INTER-CELL INTERFERENCE COORDINATION IN RADIO COMMUNICATION SYSTEM

CROSS-REFERENCE TO RELATED APPLICATIONS

This application is a Continuation of co-pending U.S. application Ser. No. 13/509,748 filed on May 14, 2012, which is the National Phase of PCT/KR2011/002155 filed on Mar. 29, 2011, which claims priority under 35 U.S.C. §119(e) to U.S. Provisional Application Nos. 61/318,758 filed on Mar. 29, 2010, 61/379,741 filed on Sep. 3, 2010, 61/405,215 filed on Oct. 21, 2010, and 61/446,033 filed on Feb. 23, 2011. The contents of all of these applications are hereby incorporated by reference as fully set forth herein in their entirety.

BACKGROUND OF THE INVENTION

1. Field of the Invention

The present invention relates to a radio communication system, and more particularly, to a method and apparatus for measurement for inter-cell interference coordination in a radio communication system.

2. Discussion of the Related Art

FIG. 1 illustrates a heterogeneous network wireless communications system 100 including a macro base station and a micro base station. In the description of the present invention, the term "heterogeneous network" refers to a network wherein a macro base station 110 and a micro base station 121 and 122 co-exist even when the same RAT (Radio Access Technology) is being used.

A macro base station 110 refers to a general base station of a wireless communication system having a broad coverage range and a high transmission power. Herein, the macro base station 110 may also be referred to a macro cell.

The micro base station 121 and 122 may also be referred to as a micro cell, a pico cell, a femto cell, a home eNB (HeNB), a relay, and so on. More specifically, the micro base station 121 and 122 corresponds to a small-sized version of the macro base station 110. Accordingly, the micro base station 121 and 122 may independently perform most of the functions of the macro base station. Herein, the micro base station 121 and 122 may correspond to an overlay base station, which may be installed in an area covered by the macro base station, or to a non-overlay base station, which may be installed in a shadow area that cannot be covered by the macro base station. As compared to the macro base station 110, the micro base station 121 and 122 has a narrower coverage range and a lower transmission power and may accommodate a smaller number of terminals (or user equipments).

A terminal 131 may directly receive services from the macro base station 110 (hereinafter referred to as a macro-terminal). And, alternatively, a terminal 132 may directly receive services from the micro base station 122 (hereinafter referred to as a micro-terminal). In some cases, a terminal 132 existing within the coverage area of the micro base station 122 may receive services from the macro base station 110.

Depending upon whether or not the terminal has limited access, the micro base station may be categorized into two different types, the first type being a CSG (Closed Subscriber Group) micro base station, and the second type being an OA (Open Access) or OSC (Open Subscriber Group) micro base station. More specifically, the CSG micro base station may serve only specific terminals that are authorized, and the OSG micro base station may serve all types of terminals without any particular access limitations.

Meanwhile, the quality of a radio link between an eNB and a UE may be degraded due to various factors. When the UE fails to receive a control signal from the eNB or the quality of a received signal is significantly degraded, this may be defined as a Radio Link Failure (RLF). To handle the RLF, the UE first identifies a problem at a physical layer and attempts to solve the physical layer problem. If the UE fails to recover from the physical layer problem, the UE may transmit a connection re-establishment request to the eNB, determining that an RLF has been detected.

SUMMARY OF THE INVENTION

In the above-described heterogeneous network, when a user equipment being served by a macro base station, due to an intense downlink signal transmitted from a micro base station, an interference may occur in a downlink signal, which the macro user equipment receives from the macro base station. Alternatively, a user equipment being served by a micro base station may receive an intense interference due to a downlink signal of a macro base station. In order to prevent such interference from occurring, for example, a method of using time or frequency resource areas (e.g., different subframes or different resource blocks) that can differentiate the micro base station from the macro base station may be considered.

Even when such method for preventing inter-cell interference is applied, there may occur a case when, due to an interference from a micro base station, a macro-user equipment existing within the coverage of a macro base station detects a radio link failure (RLF) with the macro base station and cannot communicate with the macro base station. For example, in case the micro base station performs transmission and reception during a specific section, if the macro-user equipment measures a signal from the macro base station during the corresponding specific section, despite the fact that there is no problem in the transmission and reception of the macro base station during the other sections excluding the corresponding specific section, the macro-user equipment may be capable of detecting an RLF with the macro base station.

An object of the present invention is to provide a method and apparatus that can enhance system efficiency by enabling a user equipment to accurately perform downlink measurement, when an inter-cell interference coordination (ICIC) is being applied, by designating a resource area in which the user equipment may perform various downlink measurements (e.g., a measurement for an RLM (Radio Link Monitoring) with respect to RLF detection, a measurement for a Channel State Information (CSI) report, an interference measurement, an RRM (Radio Resource Management) measurement (measurements of Reference Signal Received Power (RSRP), Reference Signal Received Quality (RSRQ), Received Signal Strength Indicator (RSSI), and so on)).

Another object of the present invention devised to solve the problem lies on a method for efficiently transmitting and receiving a signal on a backhaul link and an access link in a relay, if the relay performs a mixture of an in-band operation and an out-band operation on multiple carriers.

To achieve these objects and other advantages and in accordance with the purpose of the invention, as embodied and broadly described herein, according to an embodiment of the present invention, a method for supporting measurement of a User Equipment (UE) by a first base station in a wireless communication system includes the steps of acquiring information of downlink subframe configuration of a second base station; determining measurement objects of downlink resource of the first base station based on the downlink subframe configuration of the second base station; transmitting information of the measurement objects to the UE; and receiving measurement result for the measurement objects from the UE.

To achieve these objects and other advantages and in accordance with the purpose of the invention, as embodied and broadly described herein, according to another embodiment of the present invention, a method for performing measurement by a User Equipment (UE) in a wireless communication system includes receiving information of measurement objects from a first base station; performing measurement for the measurement objects; and transmitting measurement result to the first base station. Herein, the measurement objects may be determined from downlink resource of the first base station based on a downlink subframe configuration of a second base station.

To achieve these objects and other advantages and in accordance with the purpose of the invention, as embodied and broadly described herein, according to yet another embodiment of the present invention, an apparatus for supporting measurement of a User Equipment (UE) includes a reception module for receiving uplink signals from the UE; a transmission module for transmitting downlink signals to the UE; and a processor for controlling transmission and reception of a first base station through the transmission module and the reception module. Herein, the processor may be configured to acquire information of downlink subframe configuration of a second base station, to determine measurement objects of downlink resource of the first base station based on the downlink subframe configuration of the second base station, to transmit information of the measurement objects to the UE through the transmission module, and to receive measurement result for the measurement objects from the UE through the reception module.

To achieve these objects and other advantages and in accordance with the purpose of the invention, as embodied and broadly described herein, according to a further embodiment of the present invention, a User Equipment (UE) for performing measurement includes a reception module for receiving downlink signals from a first base station; a transmission module for transmitting uplink signals to the first base station; and a processor for controlling the UE including the transmission module and the reception module. Herein, the processor may be configured to receive information of measurement objects from a first base station through the reception module, to perform measurement for the measurement objects, and to transmit measurement result to the first base station through the transmission module. Also, the measurement objects may be determined from downlink resource of the first base station based on a downlink subframe configuration of a second base station.

The following details may be equally and commonly applied to the embodiments of the present invention.

The measurement objects may include downlink resource of the first base station not interfered by the second base station. Alternatively, the measurement objects may include downlink resource of the first base station constantly interfered by the second base station.

Information of the measurement objects may include at least one of downlink subframe, control region, data region, slot, OFDM symbol, resource block and antenna port of the first base station. Also, the information of the measurement objects may restrict a measurement region for the UE by one or a combination of downlink subframe, control region, data region, slot, OFDM symbol, resource block and antenna port of the first base station. Furthermore, the information of the measurement objects may be transmitted through RRC (Radio Resource Control) signaling.

The downlink subframe configuration of the second base station may include configuration of each of one or more downlink subframe of the second base station as normal subframe, ABS (Almost Blank Subframe), MBSFN (Multicast/Broadcast over Single Frequency Network) subframe or ABS-with-MBSFN. And, the downlink subframe configuration of the second base station may include offset of a boundary of downlink subframe of the first base station and a boundary of downlink subframe of the second base station.

The measurement result may include measurement result for at least one of RLM (Radio Link Monitoring) measurement, CSI (Channel State Information) measurement, interference measurement and RRM (Radio Resource Management) measurement. And, the measurement result for RRM measurement includes RSRQ (Reference Signal Received Quality), the RSRQ is measured by RSRP (Reference Signal Received Power) and RSSI (Received Signal Strength Indicator), and the information of the measurement objects for one or more of RSRQ, RSRP and RSSI restrict a measurement region for the UE by all OFDM symbols in a downlink subframe of the first base station.

And, the first base station may be interfered by the second base station.

It is to be understood that both the foregoing general description and the following detailed description of the present invention are exemplary and explanatory and are intended to provide further explanation of the invention as claimed.

According to an embodiment of the present invention, when an inter-cell interference coordination (ICIC) is being applied, a method and apparatus enabling a user equipment to perform an accurate downlink measurement may be provided, thereby enhancing system efficiency.

Additional advantages of the present application will be set forth in part in the description which follows and in part will become apparent to those having ordinary skill in the art upon examination of the following or may be learned from practice of the present application.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 6 illustrates a block view showing the structure of a wireless communication system having multiple antennae.

FIG. 7 illustrates CRS and DRS patterns that are defined in the conventional 3GPP LTE system.

DETAILED DESCRIPTION OF THE INVENTION

Figure 1:
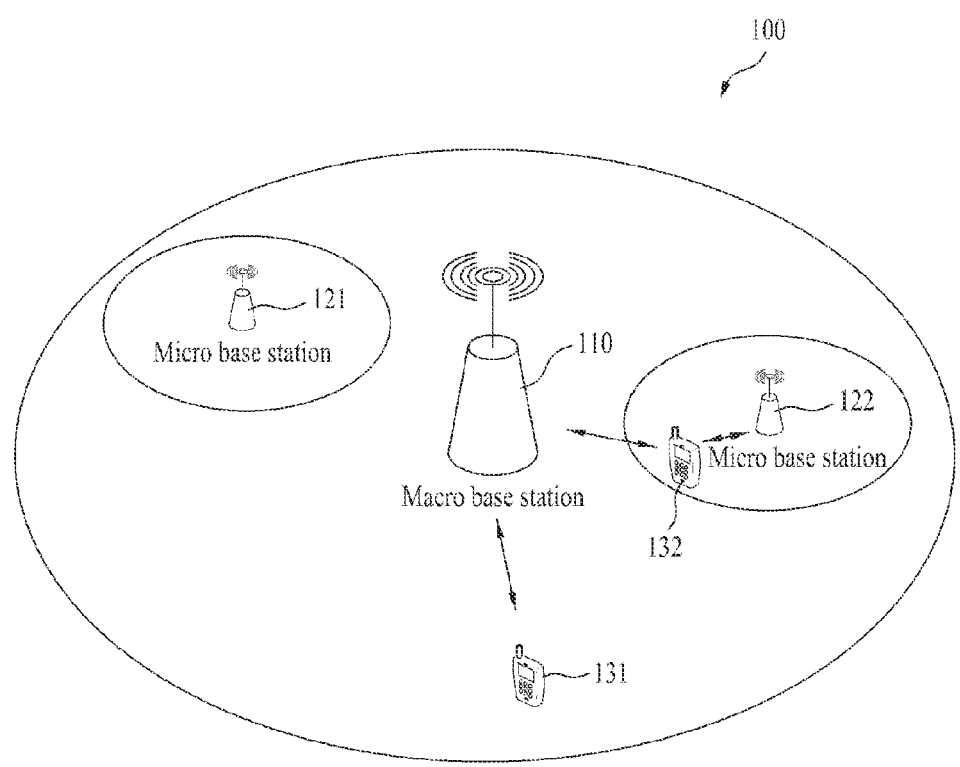
FIG. 1 illustrates a heterogeneous network wireless communication system.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a 3rd Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. The CDMA may be embodied with radio technology such as UTRA (Universal Terrestrial Radio Access) or CDMA2000. The TDMA may be embodied with radio technology such as GSM (Global System for Mobile communications)/GPRS (General Packet Radio Service)/EDGE (Enhanced Data Rates for GSM Evolution). The OFDMA may be embodied with radio technology such as Institute of Electrical and Electronics Engineers (IEEE) 802.11 (Wi-Fi), IEEE 802.16 (WiMAX), IEEE 802-20, and E-UTRA (Evolved UTRA). The UTRA is a part of the UMTS (Universal Mobile Telecommunications System). The 3GPP (3rd Generation Partnership Project) LTE (long term evolution) is a part of the E-UMTS (Evolved UMTS), which uses E-UTRA. The 3GPP LTE employs the OFDMA in downlink and employs the SC-FDMA in uplink. The LTE-Advanced (LTE-A) is an evolved version of the 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on the 3GPP LTE and 3GPP LTE-A system. However, technical features of the present invention are not limited thereto.

Figure 2:
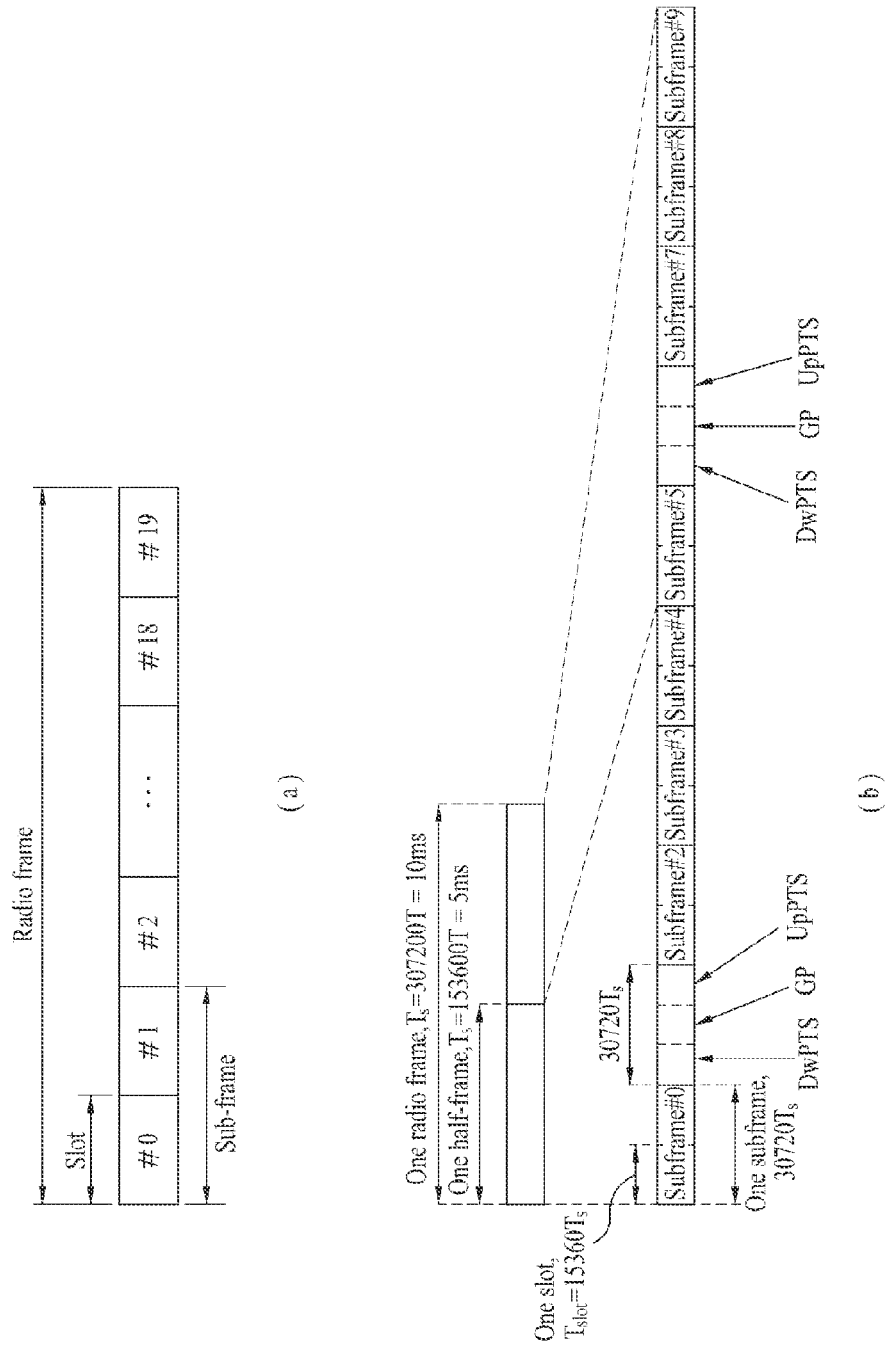
FIG. 2 illustrates a structure of a downlink wireless frame.

The structure of a downlink radio frame will be described with reference to FIG. 2.

In a cellular Orthogonal Frequency Division Multiplexing (OFDM) radio packet communication system, uplink/downlink data packet transmission is performed in subframe units. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

FIG. 2(a) is a diagram showing the structure of the type 1 radio frame. A downlink radio frame includes 10 subframes, and one subframe includes two slots in time domain. A time required for transmitting one subframe is defined in a Transmission Time Interval (TTI). For example, one subframe may have a length of 1 ms and one slot may have a length of 0.5 ms. One slot may include a plurality of OFDM symbols in time domain and include a plurality of Resource Blocks (RBs) in frequency domain. Since the 3GPP LTE system uses OFDMA in downlink, the OFDM symbol indicates one symbol duration. The OFDM symbol may be called a SC-FDMA symbol or a symbol duration. A RB is a resource allocation unit and includes a plurality of contiguous subcarriers in one slot.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, the length of one OFDM symbol is increased, the number of OFDM symbols included in one slot is less than that of the case of the normal CP. In case of the extended CP, for example, the number of OFDM symbols included in one slot may be six. If a channel state is instable, for example, if a User Equipment (UE) moves at a high speed, the extended CP may be used in order to further reduce interference between symbols.

In case of using the normal CP, since one slot includes seven OFDM symbols, one subframe includes 14 OFDM symbols. At this time, the first two or three OFDM symbols of each subframe may be allocated to a Physical Downlink Control Channel (PDCCH) and the remaining OFDM symbols may be allocated to a Physical Downlink Shared Channel (PDSCH).

FIG. 2(b) is a diagram showing the structure of the type 2 radio frame. The type 2 radio frame includes two half frames, each of which includes five subframes, a downlink pilot time slot (DwPTS), a guard period (GP), and an uplink pilot time slot (UpPTS). One of these subframes includes two slots. The DwPTS is used for initial cell search, synchronization and channel estimation at a user equipment. The UpPTS is used for channel estimation and uplink transmission synchronization of the user equipment. The guard period is to remove interference occurring in an uplink due to multi-path delay of a downlink signal between the uplink and a downlink. Meanwhile, one subframe includes two slots regardless of a type of the radio frame.

The structure of the radio frame is only exemplary. Accordingly, the number of subframes included in the radio frame, the number of slots included in the subframe or the number of symbols included in the slot may be changed in various manners.

Figure 3:
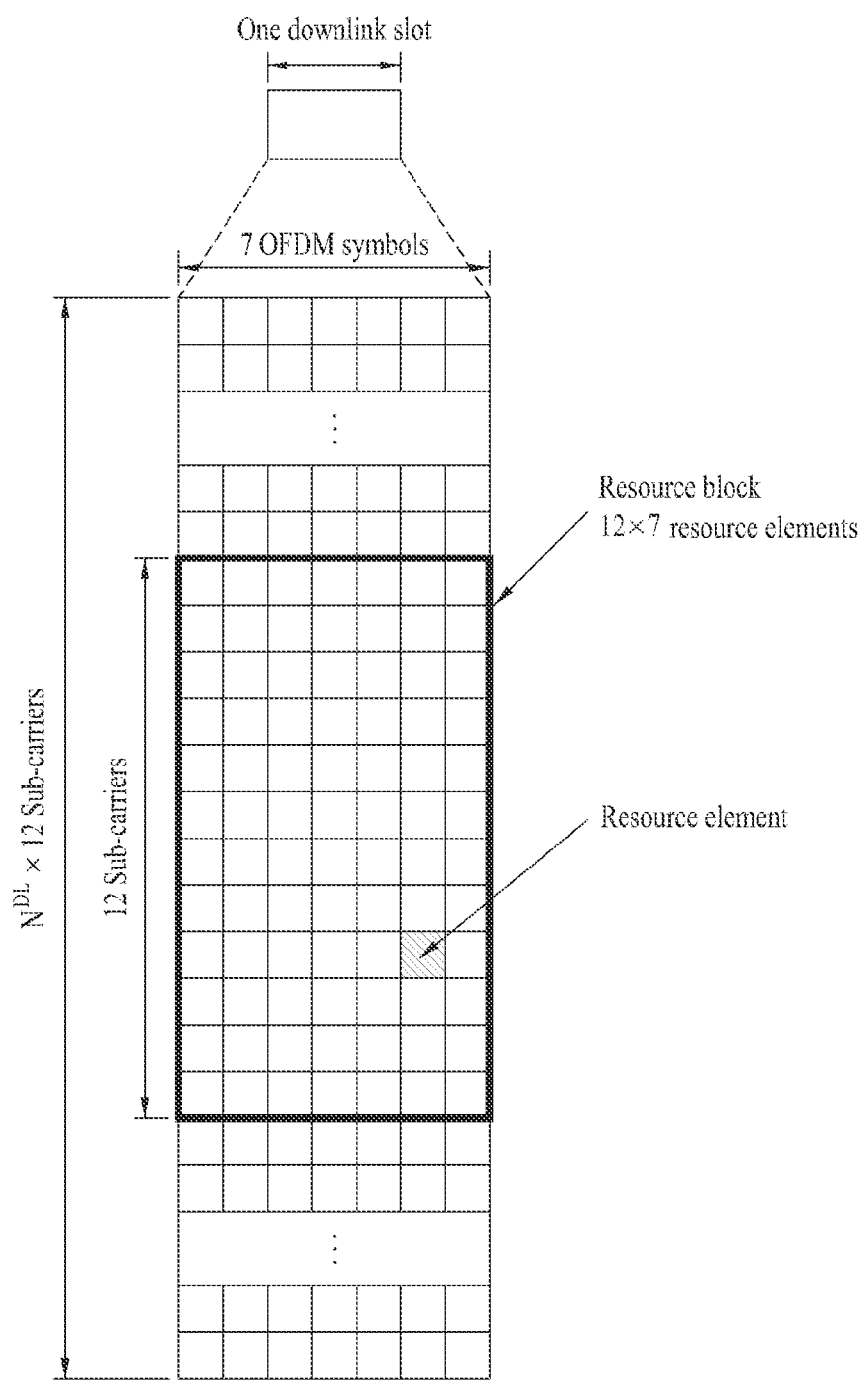
FIG. 3 illustrates a resource grid in a downlink slot.

FIG. 3 is a diagram showing a resource grid in a downlink slot. Although one downlink slot includes seven OFDM symbols in a time domain and one RB includes 12 subcarriers in a frequency domain in the figure, the present invention is not limited thereto. For example, in case of a normal Cyclic Prefix (CP), one slot includes 7 OFDM symbols. However, in case of an extended CP, one slot includes 6 OFDM symbols. Each element on the resource grid is referred to as a resource element. One RB includes 12×7 resource elements. The number NDL of RBs included in the downlink slot is determined based on a downlink transmission bandwidth. The structure of the uplink slot may be equal to the structure of the downlink slot.

Figure 4:
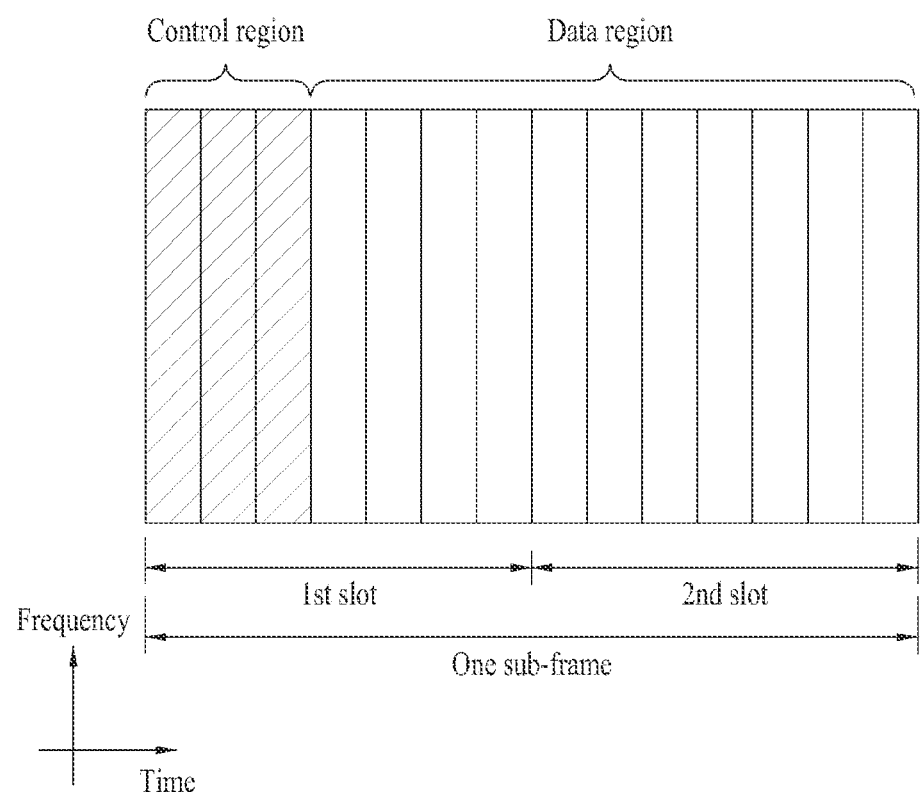
FIG. 4 illustrates a exemplary structure of a downlink subframe.

FIG. 4 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response of uplink transmission. The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of an higher layer control message such as a Random Access Response (RAR) transmitted on the PDSCH, a set of transmit power control commands for an individual UEs in a certain UE group, transmit power control information, activation of Voice over IP (VoIP), etc. A plurality of PDCCHs may be transmitted within the control region. The UE may monitor the plurality of PDCCHs. The PDCCHs are transmitted on an aggregation of one or several consecutive control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The base station determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 5:
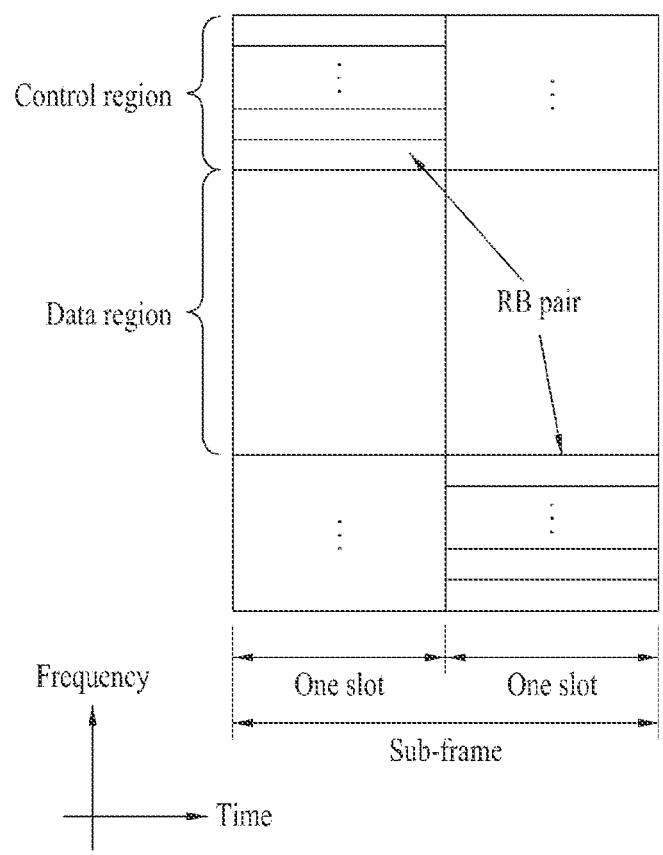
FIG. 5 illustrates a structure of an uplink subframe.

FIG. 5 is a diagram showing the structure of an uplink frame. The uplink subframe may be divided into a control region and a data region in a frequency domain. A Physical Uplink Control Channel (PUCCH) including uplink control information is allocated to the control region. A Physical uplink Shared Channel (PUSCH) including user data is allocated to the data region. In order to maintain single carrier property, one UE does not simultaneously transmit the PUCCH and the PUSCH. The PUCCH for one UE is allocated to a RB pair in a subframe. RBs belonging to the RB pair occupy different subcarriers with respect to two slots. Thus, the RB pair allocated to the PUCCH is "frequency-hopped" at a slot boundary.

Modeling of Multi-Input Multi-Output (MIMO) System

FIG. 6 is a diagram showing the configuration of a radio communication system having multiple antennas.

As shown in FIG. 6(a), if the number of transmission antennas is increased to NT and the number of reception antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate R0 upon using a single antenna and a rate increase ratio Ri.

$$R_i = \min(N_T, N_R) \qquad \text{Equation 1}$$

For example, in an MIMO system using four transmission antennas and four reception antennas, it is possible to theoretically acquire a transfer rate which is four times that of a single antenna system. After the increase in the theoretical capacity of the MIMO system was proved in the mid-1990s, various technologies of substantially improving a data transfer rate have been actively developed up to now. In addition, several technologies are already applied to the various radio communication standards such as the third-generation mobile communication and the next-generation wireless local area network (LAN).

According to the researches into the MIMO antenna up to now, various researches such as researches into information theory related to the computation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

The communication method of the MIMO system will be described in more detail using mathematical modeling. In the above system, it is assumed that $N_T$ transmission antennas and $N_R$ reception antennas are present.

In transmitted signals, if the $N_T$ transmission antennas are present, the number of pieces of maximally transmittable information is $N_T$. The transmitted information may be expressed as follows.

$$s = [s_1, s_2, \ldots, s_{N_T}]^T \qquad \text{Equation 2}$$

The transmitted information $s_1, s_2, \ldots, s_{N_T}$ may have different transmit powers. If the respective transmit powers are $P_1, P_2, \ldots, P_{N_T}$, the transmitted information with adjusted powers may be expressed as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{Equation 3}$$

In addition, $\hat{S}$ may be expressed using a diagonal matrix $P$ of the transmit powers as follows.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{Equation 4}$$

Consider that the $N_T$ actually transmitted signals $x_1, x_2, \ldots, x_{N_T}$ are configured by applying a weight matrix W to the information vector $\hat{S}$ with the adjusted transmit powers. The weight matrix W serves to appropriately distribute the transmitted information to each antenna according to a transport channel state, etc. $x_1, x_2, \ldots, x_{N_T}$ may be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & & \ddots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{Equation 5}$$

where, $w_{ij}$ denotes a weight between an i-th transmission antenna and j-th information. W is also called a precoding matrix.

In received signals, if the $N_R$ reception antennas are present, respective received signals $y_1, y_2, \ldots, y_{N_R}$ of the antennas are expressed as follows.

$$y = [y_1, y_2, \ldots, y_{N_R}]^T \qquad \text{Equation 6}$$

If channels are modeled in the MIMO radio communication system, the channels may be distinguished according to transmission/reception antenna indexes. A channel from the transmission antenna j to the reception antenna i is denoted by $h_{ij}$. In $h_{ij}$, it is noted that the indexes of the reception antennas precede the indexes of the transmission antennas in view of the order of indexes.

FIG. 6(b) is a diagram showing channels from the $N_T$ transmission antennas to the reception antenna i. The channels may be combined and expressed in the form of a vector and a matrix. In FIG. 6(b), the channels from the $N_T$ transmission antennas to the reception antenna i may be expressed as follows.

$$h_i^T = [h_{i1}, h_{i2}, \ldots, h_{iN_T}] \qquad \text{Equation 7}$$

Accordingly, all the channels from the $N_T$ transmission antennas to the $N_R$ reception antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \qquad \text{Equation 8}$$

An Additive White Gaussian Noise (AWGN) is added to the actual channels after a channel matrix H. The AWGN $n_1, n_2, \ldots, n_{N_R}$ added to the $N_T$ transmission antennas may be expressed as follows.

$$n = [n_1, n_2, \ldots, n_{N_R}]^T \qquad \text{Equation 9}$$

Through the above-described mathematical modeling, the received signals may be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \qquad \text{Equation 10}$$

$$Hx + n$$

The number of rows and columns of the channel matrix H indicating the channel state is determined by the number of transmission and reception antennas. The number of rows of the channel matrix H is equal to the number $N_R$ of reception antennas and the number of columns thereof is equal to the number $N_T$ of transmission antennas. That is, the channel matrix H is an $N_R \times N_T$ matrix.

The rank of the matrix is defined by the smaller of the number of rows or columns, which is independent from each other. Accordingly, the rank of the matrix is not greater than the number of rows or columns. The rank rank(H) of the channel matrix H is restricted as follows.

$$\text{rank}(H) \leq \min(N_T, N_R) \qquad \text{Equation 11}$$

When the matrix is subjected to Eigen value decomposition, the rank may be defined by the number of Eigen values excluding 0. Similarly, when the matrix is subjected to singular value decomposition, the rank may be defined by the number of singular values excluding 0. Accordingly, the physical meaning of the rank in the channel matrix may be a maximum number of different transmittable information in a given channel.

Reference Signal (RS)

In a radio communication system, since packets are transmitted through a radio channel, a signal may be distorted during transmission. In order to enable a reception side to correctly receive the distorted signal, distortion of the received signal should be corrected using channel information. In order to detect the channel information, a method of transmitting a signal, of which both the transmission side and the reception side are aware, and detecting channel information using a distortion degree when the signal is received through a channel is mainly used. The above signal is referred to as a pilot signal or a reference signal (RS).

When transmitting and receiving data using multiple antennas, the channel states between the transmission antennas and the reception antennas should be detected in order to correctly receive the signal. Accordingly, each transmission antenna has an individual RS.

A downlink RS includes a Common RS (CRS) shared among all UEs in a cell and a Dedicated RS (DRS) for only a specific-UE. It is possible to provide information for channel estimation and demodulation using such RSs.

The reception side (UE) estimates the channel state from the CRS and feeds back an indicator associated with channel quality, such as a Channel Quality Indicator (CQI), a Precoding Matrix Index (PMI) and/or a Rank Indicator (RI), to the transmission side (eNodeB). The CRS may be also called a cell-specific RS. Alternatively, an RS associated with the feedback of Channel State Information (CSI) such as CQI/PMI/RI may be separately defined as a CSI-RS.

The DRS may be transmitted through REs if data demodulation on a PDSCH is necessary. The UE may receive the presence/absence of the DRS from a higher layer and receive information indicating that the DRS is valid only when the PDSCH is mapped. The DRS may be also called a UE-specific RS or a Demodulation RS (DMRS).

FIG. 7 is a diagram showing a pattern of CRSs and DRSs mapped on a downlink RB defined in the existing 3GPP LTE system (e.g., Release-8). The downlink RB as a mapping unit of the RSs may be expressed in units of one subframe on a time domain×12 subcarriers on a frequency domain. That is, on the time axis, one RB has a length of 14 OFDM symbols in case of the normal CP (FIG. 7(a)) and has a length of 12 OFDM symbols in case of the extended CP (FIG. 7(b)).

FIG. 7 shows the locations of the RSs on the RB in the system in which the eNodeB supports four transmission antennas. In FIG. 7, Resource Elements (REs) denoted by "0", "1", "2" and "3" indicate the locations of the CRSs of the antenna port indexes 0, 1, 2 and 3, respectively. In FIG. 7, the RE denoted by "D" indicates the location of the DRS.

Hereinafter, the CRS will be described in detail.

The CRS is used to estimate the channel of a physical antenna and is distributed over the entire band as an RS which is able to be commonly received by all UEs located within a cell. The CRS may be used for CSI acquisition and data demodulation.

The CRS is defined in various formats according to the antenna configuration of the transmission side (eNodeB). The 3GPP LTE (e.g., Release-8) system supports various antenna configurations, and a downlink signal transmission side (eNodeB) has three antenna configurations such as a single antenna, two transmission antennas and four transmission antennas. If the eNodeB performs single-antenna transmission, RSs for a single antenna port are arranged. If the eNodeB performs two-antenna transmission, RSs for two antenna ports are arranged using a Time Division Multiplexing (TDM) and/or Frequency Division Multiplexing (FDM) scheme. That is, the RSs for the two antenna ports are arranged in different time resources and/or different frequency resources so as to be distinguished from each other. In addition, if the eNodeB performs four-antenna transmission, RSs for four antenna ports are arranged using the TDM/FDM scheme. The channel information estimated by the downlink signal reception side (UE) through the CRSs may be used to demodulate data transmitted using a transmission scheme such as single antenna transmission, transmit diversity, closed-loop spatial multiplexing, open-loop spatial multiplexing, or Multi-User MIMO (MU-MIMO).

If multiple antennas are supported, when RSs are transmitted from a certain antenna port, the RSs are transmitted at the locations of the REs specified according to the RS pattern and any signal is not transmitted at the locations of the REs specified for another antenna port.

The rule of mapping the CRSs to the RBs is defined by Equation 12.

$$k = 6m + (v + v_{shift}) \bmod 6$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

Equation 12

In Equation 12, k denotes a subcarrier index, l denotes a symbol index, and p denotes an antenna port index. $N_{symb}^{DL}$ denotes the number of OFDM symbols of one downlink slot, $N_{RB}^{DL}$ denotes the number of RBs allocated to the downlink, $n_s$ denotes a slot index, and $N_{ID}^{cell}$ denotes a cell ID. mod indicates a modulo operation. The location of the RS in the frequency domain depends on a value $V_{shift}$. Since the value $V_{shift}$ depends on the cell ID, the location of the RS has a frequency shift value which varies according to the cell.

In detail, in order to increase channel estimation performance through the CRSs, the locations of the CRSs in the frequency domain may be shifted so as to be changed according to the cells. For example, if the RSs are located at an interval of three subcarriers, the RSs are arranged on 3k-th subcarriers in one cell and arranged on (3k+1)-th subcarriers in the other cell. In view of one antenna port, the RSs are arranged at an interval of 6 REs (that is, interval of 6 subcarriers) in the frequency domain and are separated from REs, on which RSs allocated to another antenna port are arranged, by 3 REs in the frequency domain.

In addition, power boosting is applied to the CRSs. The power boosting indicates that the RSs are transmitted using higher power by bringing (stealing) the powers of the REs except for the REs allocated for the RSs among the REs of one OFDM symbol.

In the time domain, the RSs are arranged from a symbol index (l=0) of each slot as a starting point at a constant interval. The time interval is differently defined according to the CP length. The RSs are located on symbol indexes 0 and 4 of the slot in case of the normal CP and are located on symbol indexes 0 and 3 of the slot in case of the extended CP. Only RSs for a maximum of two antenna ports are defined in one OFDM symbol. Accordingly, upon four-transmission antenna transmission, the RSs for the antenna ports 0 and 1 are located on the symbol indexes 0 and 4 (the symbol indexes 0 and 3 in case of the extended CP) of the slot and the RSs for the antenna ports 2 and 3 are located on the symbol index 1 of the slot. The frequency locations of the RSs for the antenna ports 2 and 3 in the frequency domain are exchanged with each other in a second slot.

In order to support spectrum efficiency higher than that of the existing 3GPP LTE (e.g., Release-8) system, a system (e.g., an LTE-A system) having the extended antenna configuration may be designed. The extended antenna configuration may have, for example, eight transmission antennas. In the system having the extended antenna configuration, UEs which operate in the existing antenna configuration needs to be supported, that is, backward compatibility needs to be supported. Accordingly, it is necessary to support a RS pattern according to the existing antenna configuration and to design a new RS pattern for an additional antenna configuration. If CRSs for the new antenna ports are added to the system having the existing antenna configuration, RS overhead is rapidly increased and thus data transfer rate is reduced. In consideration of these problems, in an LTE-A (Advanced) system which is an evolution version of the 3GPP LTE system, separate RSs (CSI-RSs) for measuring the CSI for the new antenna ports may be used.

Hereinafter, the DRS will be described in detail.

The DRS (or UE-specific RS) is used to demodulate data. A precoding weight used for a specific UE upon multi-antenna transmission is also used in an RS without change so as to estimate an equivalent channel, in which a transfer channel and the precoding weight transmitted from each transmission antenna are combined, when the UE receives the RSs.

The existing 3GPP LTE system (e.g., Release-8) supports four-transmission antenna transmission as a maximum and the DRS for Rank 1 beamforming is defined. The DRS for Rank 1 beamforming is also denoted by the RS for the antenna port index 5. The rule of the DRS mapped on the RBs is defined by Equations 13 and 14. Equation 13 is for the normal CP and Equation 14 is for the extended CP.

$$k = (k') \bmod N_{sc}^{RB} + N_{sc}^{RB} \cdot n_{PRB} \quad \text{Equation 13}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{Equation 14}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 13 and 14, k denotes a subcarrier index, l denotes a symbol index, and p denotes an antenna port index. $N_{SC}^{RB}$ denotes the resource block size in the frequency domain and is expressed by the number of subcarriers. $n_{PRB}$ denotes a physical resource block number. $N_{RB}^{PDSCH}$ denotes the bandwidth of the RB of the PDSCH transmission. $n_s$ denotes a slot index, and $N_{ID}^{cell}$ denotes a cell ID. mod indicates a modulo operation. The location of the RS in the frequency domain depends on a value $V_{shift}$. Since the value $V_{shif}$ depends on the cell ID, the location of the RS has a frequency shift value which varies according to the cell.

In the LTE-A system which is the evolution version of the 3GPP LTE system, high-order MIMO, multi-cell transmission, evolved MU-MIMO or the like is considered. In order to support efficient RS management and a developed transmission scheme, DRS-based data demodulation is considered. That is, separately from the DRS (antenna port index 5) for Rank 1 beamforming defined in the existing 3GPP LTE (e.g., Release-8) system, DRSs for two or more layers may be defined in order to support data transmission through the added antenna.

Cooperative Multi-Point (CoMP)

According to the improved system performance requirements of the 3GPP LTE-A system, CoMP transmission/reception technology (may be referred to as co-MIMO, collaborative MIMO or network MIMO) is proposed. The CoMP technology can increase the performance of the UE located on a cell edge and increase average sector throughput.

In general, in a multi-cell environment in which a frequency reuse factor is 1, the performance of the UE located on the cell edge and average sector throughput may be reduced due to Inter-Cell Interference (ICI). In order to reduce the ICI, in the existing LTE system, a method of enabling the UE located on the cell edge to have appropriate throughput and performance using a simple passive method such as Fractional Frequency Reuse (FFR) through the UE-specific power control in the environment restricted by interference is applied. However, rather than decreasing the use of frequency resources per cell, it is preferable that the ICI is reduced or the UE reuses the ICI as a desired signal. In order to accomplish the above object, a CoMP transmission scheme may be applied.

The CoMP scheme applicable to the downlink may be largely classified into a Joint Processing (JP) scheme and a Coordinated Scheduling/Beamforming (CS/CB) scheme.

In the JP scheme, each point (eNodeB) of a CoMP unit may use data. The CoMP unit refers to a set of eNodeBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by the coordination of the cells of the CoMP unit.

In uplink, coordinated multi-point reception refers to reception of a signal transmitted by coordination of a plurality of geographically separated points. The CoMP scheme applicable to the uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by the coordination of the cells of the CoMP unit.

Sounding RS (SRS)

An SRS is used for enabling an eNodeB to measure channel quality so as to perform frequency-selective scheduling on the uplink and is not associated with uplink data and/or control information transmission. However, the present invention is not limited thereto and the SRS may be used for improved power control or supporting of various start-up functions of UEs which are not recently scheduled. Examples of the start-up functions may include, for example, initial Modulation and Coding Scheme (MCS), initial power control for data transmission, timing advance, and frequency-semi-selective scheduling (scheduling for selectively allocating frequency resources in a first slot of a subframe and pseudo-randomly hopping to another frequency in a second slot).

In addition, the SRS may be used for downlink channel quality measurement on the assumption that the radio channel is reciprocal between the uplink and downlink. This assumption is particularly valid in a Time Division Duplex (TDD) system in which the same frequency band is shared between the uplink and the downlink and is divided in the time domain.

The subframe through which the SRS is transmitted by a certain UE within the cell is indicated by cell-specific broadcast signaling. 4-bit cell-specific "srsSubframeConfiguration" parameter indicates 15 possible configurations of the subframe through which the SRS can be transmitted within each radio frame. By such configurations, it is possible to provide adjustment flexibility of SRS overhead according to a network arrangement scenario. The remaining one (sixteenth) configuration of the parameters indicates the switch-off of the SRS transmission within the cell and is suitable for a serving cell for serving high-rate UEs.

Figure 8:
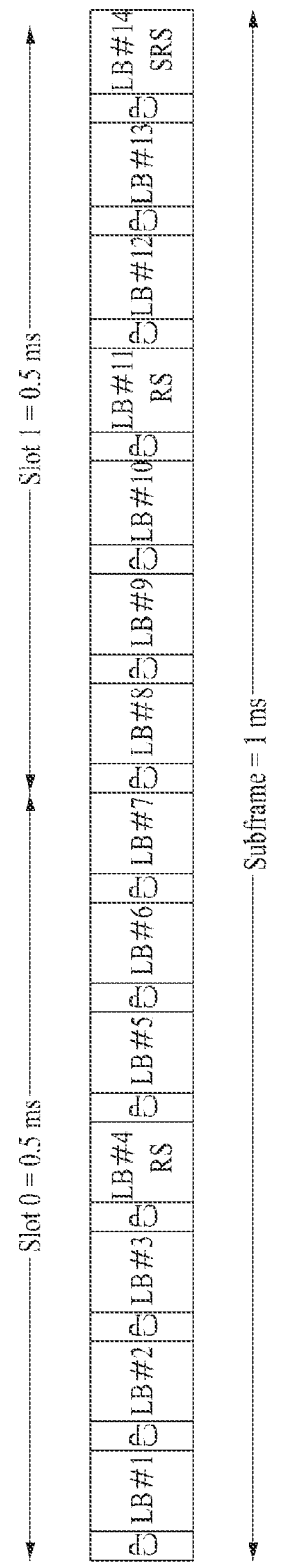
FIG. 8 illustrates an uplink subframe structure including an SRS symbol.

As shown in FIG. 8, the SRS is always transmitted on a last SC-FDMA symbol of the configured subframe. Accordingly, the SRS and a Demodulation RS (DMRS) are located on different SC-FDMA symbols. PUSCH data transmission is not allowed on the SC-FDMA symbol specified for SRS transmission and thus sounding overhead does not approximately exceed 7% even when it is highest (that is, even when SRS transmission symbols are present in all subframes).

Each SRS symbol is generated by the basic sequence (random sequence or Zadoff-Ch (ZC)-based sequence set) with respect to a given time unit and frequency band, and all UEs within the cell use the same basic sequence. At this time, the SRS transmission of the plurality of UEs within the cell in the same time unit and the same frequency band is orthogonally distinguished by different cyclic shifts of the base sequence allocated to the plurality of UEs. The SRS sequences of different cells can be distinguished by allocating different basic sequences to respective cells, but the orthogonality between the different basic sequences is not guaranteed.

Relay Node (RN)

A RN may be considered for, for example, enlargement of high data rate coverage, improvement of group mobility, temporary network deployment, improvement of cell edge throughput and/or provision of network coverage to a new area.

A RN forwards data transmitted or received between the eNodeB and the UE, two different links (backhaul link and access link) are applied to the respective carrier frequency bands having different attributes. The eNodeB may include a donor cell. The RN is wirelessly connected to a radio access network through the donor cell.

The backhaul link between the eNodeB and the RN may be represented by a backhaul downlink if downlink frequency bands or downlink subframe resources are used, and may be represented by a backhaul uplink if uplink frequency bands or uplink subframe resources are used. Here, the frequency band is resource allocated in a Frequency Division Duplex (FDD) mode and the subframe is resource allocated in a Time Division Duplex (TDD) mode. Similarly, the access link between the RN and the UE(s) may be represented by an access downlink if downlink frequency bands or downlink subframe resources are used, and may be represented by an access uplink if uplink frequency bands or uplink subframe resources are used.

The eNodeB must have functions such as uplink reception and downlink transmission and the UE must have functions such as uplink transmission and downlink reception. The RN must have all functions such as backhaul uplink transmission to the eNodeB, access uplink reception from the UE, the backhaul downlink reception from the eNodeB and access downlink transmission to the UE.

Figure 9:
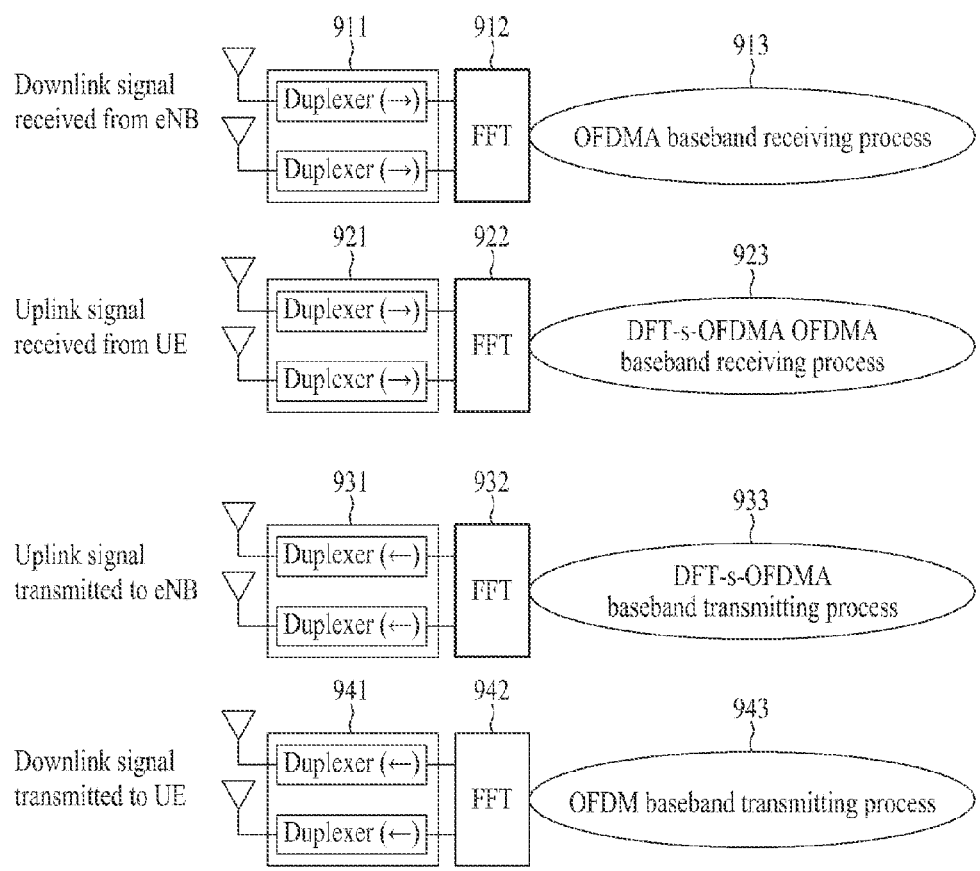
FIG. 9 illustrates an example of realizing transmitter and receiver functions of an FDD mode relay station.

FIG. 9 is a diagram showing an example of implementing transmission and reception functions of a FDD-mode RN. The reception function of the RN will now be conceptually described. A downlink signal received from the eNodeB is forwarded to a Fast Fourier Transform (FFT) module 912 through a duplexer 911 and is subjected to an OFDMA baseband reception process 913. An uplink signal received from the UE is forwarded to a FFT module 922 through a duplexer 921 and is subjected to a Discrete Fourier Transform-spread-OFDMA (DFT-s-OFDMA) baseband reception process 923. The process of receiving the downlink signal from the eNodeB and the process of receiving the uplink signal from the UE may be simultaneously performed. The transmission function of the RN will now be described. The uplink signal transmitted to the eNodeB is transmitted through a DFT-s-OFDMA baseband transmission process 933, an Inverse FFT (IFFT) module 932 and a duplexer 931. The downlink signal transmitted to the UE is transmitted through an OFDM baseband transmission process 943, an IFFT module 942 and a duplexer 941. The process of transmitting the uplink signal to the eNodeB and the process of transmitting the downlink signal to the UE may be simultaneously performed. In addition, the duplexers shown as functioning in one direction may be implemented by one bidirectional duplexer. For example, the duplexer 911 and the duplexer 931 may be implemented by one bidirectional duplexer and the duplexer 921 and the duplexer 941 may be implemented by one bidirectional duplexer. The bidirectional duplexer may branch into the IFFT module associated with the transmission and reception on a specific carrier frequency band and the baseband process module line.

In association with the use of the band (or the spectrum) of the RN, the case where the backhaul link operates in the same frequency band as the access link is referred to as "in-band" and the case where the backhaul link and the access link operate in different frequency bands is referred to as "outband". In both the in-band case and the out-band case, a UE which operates according to the existing LTE system (e.g., Release-8), hereinafter, referred to as a legacy UE, must be able to be connected to the donor cell.

The RN may be classified into a transparent RN or a non-transparent RN depending on whether or not the UE recognizes the RN. The term "transparent" indicates that the UE cannot recognize whether communication with the network is performed through the RN and the term "non-transparent" indicates that the UE recognizes whether communication with the network is performed through the RN.

In association with the control of the RN, the RN may be classified into a RN configured as a part of the donor cell or a RN for controlling the cell.

The RN configured as the part of the donor cell may have a RN ID, but does not have its cell identity. When at least a part of Radio Resource Management (RRM) of the RN is controlled by the eNodeB to which the donor cell belongs (even when the remaining parts of the RRM are located on the RN), the RN is configured as the part of the donor cell. Preferably, such an RN can support a legacy UE. For example, examples of such an RN include various types of relays such as smart repeaters, decode-and-forward relays, L2 (second layer) relays and Type-2 relays.

In the RN for controlling the cell, the RN controls one or several cells, unique physical layer cell identities are provided to the cells controlled by the RN, and the same RRM mechanism may be used. From the viewpoint of the UE, there is no difference between access to the cell controlled by the RN and access to the cell controlled by a general eNodeB. Preferably, the cell controlled by such an RN may support a legacy UE. For example, examples of such an RN include self-backhauling relays, L3 (third layer) relays, Type-1 relays and Type-1a relays.

The Type-1 relay is an in-band relay for controlling a plurality of cells, which appears to be different from the donor cell, from the viewpoint of the UE. In addition, the plurality of cells has respective physical cell IDs (defined in the LTE Release-8) and the RN may transmit its synchronization channel, RSs, etc. In a single-cell operation, the UE may directly receive scheduling information and HARQ feedback from the RN and transmit its control channel (Scheduling Request (SR), CQI, ACK/NACK, etc.) to the RN. In addition, a legacy UE (a UE which operates according to the LTE Release-8 system) regards the Type-1 relay as a legacy eNodeB (an eNodeB which operates according to the LTE Release-8 system). That is, the Type-1 relay has backward compatibility. The UEs which operates according to the LTE-A system regard the Type-1 relay as an eNodeB different from the legacy eNodeB, thereby achieving performance improvement.

The Type-1a relay has the same characteristics as the above-described Type-1 relay except that it operates as an out-band relay. The Type-1a relay may be configured so as to minimize or eliminate an influence of the operation thereof on an L1 (first layer) operation.

The Type-2 relay is an in-band relay and does not have a separate physical cell ID. Thus, a new cell is not established. The Type-2 relay is transparent to the legacy UE and the legacy UE does not recognize the presence of the Type-2 relay. The Type-2 relay can transmit a PDSCH, but does not transmit at least a CRS and a PDCCH.

In order to enable the RN to operate as the in-band relay, some resources in a time-frequency space must be reserved for the backhaul link so as not to be used for the access link. This is called resource partitioning.

The general principle of the resource partitioning in the RN will now be described. The backhaul downlink and the access downlink may be multiplexed on one carrier frequency using a Time Division Multiplexing (TDM) scheme (that is, only one of the backhaul downlink or the access downlink is activated in a specific time). Similarly, the backhaul uplink and the access uplink may be multiplexed on one carrier frequency using the TDM scheme (that is, only one of the backhaul uplink or the access uplink is activated in a specific time).

The multiplexing of the backhaul link using a FDD scheme indicates that backhaul downlink transmission is performed in a downlink frequency band and the backhaul uplink transmission is performed in an uplink frequency band. The multiplexing of the backhaul link using the TDD scheme indicates that the backhaul downlink transmission is performed in a downlink subframe of the eNodeB and the RN and the backhaul uplink transmission is performed in an uplink subframe of the eNodeB and the RN.

In the in-band relay, for example, if the backhaul downlink reception from the eNodeB and the access downlink transmission to the UE are simultaneously performed in a predetermined frequency band, the signal transmitted from the transmitter of the RN may be received by the receiver of the RN and thus signal interference or RF jamming may occur in the RF front end of the RN. Similarly, if the access uplink reception from the UE and the backhaul uplink transmission to the eNodeB are simultaneously performed in a predetermined frequency band, signal interference may occur in the RF front end of the RN. Accordingly, it is difficult to implement the simultaneous transmission and reception in one frequency band at the RN unless the received signal and the transmitted signal are sufficiently separated (for example, unless the transmission antennas and the reception antennas are sufficiently separated form each other (for example, on the ground or under the ground) in terms of geographical positions).

Figure 10:
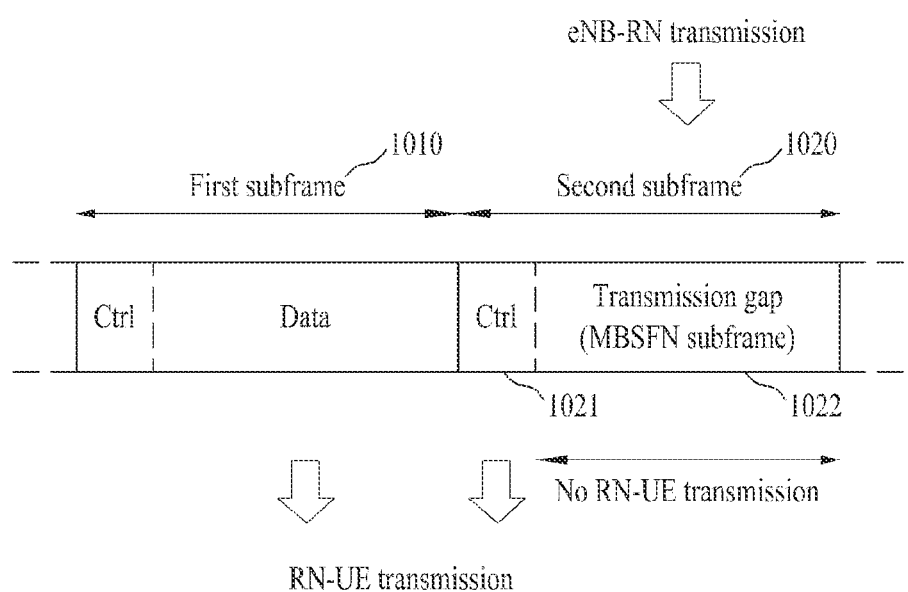
FIG. 10 illustrates a transmission of a user equipment from a relay station and a downlink transmission of a relay station from a base station.

As a method for solving the signal interference, the RN operates so as not to transmit a signal to the UE while a signal is received from the donor cell. That is, a gap may be generated in the transmission from the RN to the UE and any transmission from the RN to the UE (including the legacy UE) may not be performed. Such a gap may be set by configuring a Multicast Broadcast Single Frequency Network (MBSFN) subframe (see FIG. 10). In FIG. 10, a first subframe 1010 is a general subframe, in which a downlink (that is, access downlink) control signal and data is transmitted from the RN to the UE, and a second subframe 1020 is an MBSFN subframe, in which a control signal is transmitted from the RN to the UE in a control region 1021 of the downlink subframe, but any signal is not transmitted from the RN to the UE in the remaining region 1022 of the downlink subframe. Since the legacy UE expects the transmission of the PDCCH in all downlink subframes (that is, the RN needs to enable the legacy UEs within its own area to receive the PDCCH in every subframe so as to perform a measurement function), for the correct operation of the legacy UEs, it is necessary to transmit the PDCCH in all the downlink subframes. Accordingly, even on the subframe (the second subframe 1020)) set for the transmission of the downlink (that is, the backhaul downlink) from the eNodeB to the RN, the RN needs to transmit the access downlink in first N (N=1, 2 or 3) OFDM symbol intervals of the subframe, without receiving the backhaul downlink. Since the PDCCH is transmitted from the RN to the UE in the control region 1021 of the second subframe, it is possible to provide backward compatibility to the legacy UE served by the RN. While any signal is not transmitted from the RN to the UE in the remaining region 1022 of the second subframe, the RN may receive the signal transmitted from the eNodeB. Accordingly, the resource partitioning disables the in-band RN to simultaneously perform the access downlink transmission and the backhaul downlink reception.

The second subframe 1022 using the MBSFN subframe will now be described in detail. The control region 1021 of the second subframe may be a RN non-hearing interval. The RN non-hearing interval refers to an interval in which the RN does not receive a backhaul downlink signal and transmits an access downlink signal. This interval may be set to 1, 2 or 3 OFDM lengths as described above. The RN performs the access downlink transmission to the UE in the RN non-hearing interval 1021 and performs the backhaul downlink reception from the eNodeB in the remaining region 1022. At this time, since the RN cannot simultaneously perform the transmission and reception in the same frequency band, it takes a certain length of time to switch the RN from the transmission mode to the reception mode. Accordingly, it is necessary to set a guard time (GT) to switch the RN from the transmission mode to the reception mode in a first portion of the backhaul downlink reception region 1022. Similarly, even when the RN receives the backhaul downlink from the eNodeB and transmits the access downlink to the UE, a guard time (GT) to switch the RN from the reception mode to the transmission mode may be set. The length of the guard time may be set to values of the time domain, for example, values of k (k≥1) time samples Ts or one or more OFDM symbol lengths. Alternatively, if the backhaul downlink subframes of the RN are consecutively set or according to a predetermined subframe timing alignment relationship, the guard time of a last portion of the subframes may not be defined or set. Such a guard time may be defined only in the frequency domain just for the transmission of the backhaul downlink subframe, in order to maintain backward compatibility (the legacy UE cannot be supported if the guard time is set in the access downlink interval). The RN can receive a PDCCH and a PDSCH from the eNodeB in the backhaul downlink reception interval 1022 except for the guard time. Such PDCCH and the PDSCH are physical channels dedicated for RN and thus may be represented by a R-PDCCH (Relay-PDCCH) and a R-PDSCH (Relay-PDSCH).

RLF-Related Operation

An RLF may occur between an eNB and a UE. The RLF means a state in which the quality of a radio link between the eNB and the UE is degraded and thus signal transmission and reception is difficult between them. A description will be given below of a procedure for detecting an RLF and searching for a new radio link.

In the 3GPP LTE system, Radio Resource Control (RRC) state between an eNB and a UE is divided into RRC_CONNECTED state and RRC_IDLE state. In the RRC_CONNECTED state, an RRC connection has been established between the eNB and the UE and thus the UE can transmit data to and receive data from the eNB. When the RRC connection is released between the UE and the eNB, this state is called the RRC_IDLE state.

An RLF-related operation involves (1) detection of a physical layer problem in the RRC_CONNECTED state, (2) recovery from the physical layer problem, and (3) RLF detection.

(1) Upon receipt of as many consecutive "out-of-sync" indications as a predetermined value N310 from a lower layer, the UE activates a T310 timer. "Out-of-sync" indications is an event occurring when the UE measures signals from a serving eNB and the quality of measured channel falls below a predetermined level. Here, the channel quality may be determined by SNR (Signal-to-Noise Ratio) measured using Cell-specific Reference Signal (CRS) from the downlink signals. Further, the lower layer (i.e. the physical layer) may provide an "out-of-sync" indication to a higher layer, when demodulation of a received PDCCH is impossible or the Signal-to-Interference plus Noise Ratio (SINR) of the PDCCH is low. N310 and T310 are higher-layer parameters that may be preset.

(2) Upon receipt of as many consecutive "in-sync" indications as a predetermined value N311 while the T310 timer is running, the UE stops the T310 timer. N311 is a higher-layer parameter that may be predefined.

(3) Upon expiration of the T310 timer, the UE starts a connection re-establishment procedure, determining that an RLF has been detected. The expiration of the T310 timer implies that the T310 timer has reached a predetermined time T310 without stopping in the middle. In the connection re-establishment procedure, the UE transmits an RRC connection re-establishment request to the eNB, receives an RRC connection re-establishment message from the eNB, and then transmits an RRC connection re-establishment completion message to the eNB. For details of the RLF-related operation, section 5.3.11 of the 3GPP standard document, TS36.331 may be referred to.

As stated before, the RLF process is a process of searching for a new link, when the link state between a transmitter and a receiver keeps degraded during activating an internal timer. Because it is difficult to predict the state of the link (Uu link) between the eNB and the UE in the 3GPP LTE system, it is determined whether an RLF has been detected using parameters such as N310, N311 and T310.

Operation of Measurement for ICIC

Referring back to FIG. 1, description will be made on a case where an inter-cell interference of a micro base station with respect to a downlink to a macro-user equipment occurs from a macro base station. For example, it is assumed that the micro base station (122) corresponds to a CSG cell allowing access only to a specific user equipment. Additionally, it is assumed that the user equipment (132) corresponds to a macro-user equipment that is served by the macro base station (110). More specifically, it is also assumed that the user equipment (132) is not included in the CSG of the micro base station (122). In this case, the user equipment (132) is positioned within the coverage of the micro base station (122). However, since the user equipment (132) is incapable of accessing the corresponding micro base station (122), the user equipment (132) may perform transmission and reception to and from a macro base station 110, which is located at a more remote location. As a result, in performing downlink reception, the user equipment (132) eventually receives an intense interference from the micro base station (122).

A variety of methods for controlling such inter-cell interference may be considered. For example, a case assuming that a macro base station receives an interference from the micro base station will now be described. As a method for controlling inter-cell interference, a method of reducing the influence on uplink/downlink quality between the macro base station and the macro-user equipment, by chronologically/spatially shifting uplink/downlink transmission resource between the micro base station and the micro-user equipment, and a method of reducing the influence by performing a puncturing process in a downlink of the micro base station on essential parts (e.g., CRS) of the downlink signals of the macro base station, wherein the essential parts of the downlink signals are used for maintaining a radio link with the macro-user equipment, may be considered. Additionally, as a method for reducing influence of the micro base station on the macro base station, a method enabling the micro base station to perform transmission only during a specific section (e.g., an odd-numbered subframe within the time or a partial RB within the frequency) may also be considered.

However, even when such inter-cell interference coordinating methods are applied, an RLF between the macro base station and the macro-user equipment may still occur. For example, in case the macro-user equipment is positioned at a remote location from the macro base station, and in case the macro-user equipment is served by the macro base station, due to a strong interference from a micro base station neighboring the macro-user equipment, the macro-user equipment may detect that a radio link quality between the macro-user equipment and the macro base station is extremely low. In case an RLF occurs, the macro-user equipment determines that the radio link with the macro base station is not suitable for transmission and reception. And, accordingly, the macro-user equipment performs a procedure for searching a new adequate cell. Most particularly, among the above-described inter-cell interference coordinating methods, in case the micro base station applies a method of performing transmission only during a specific section, even if there is no operational problem in the macro base station during the other sections excluding the corresponding specific section, there may lie a problem in that the user equipment detects an RLF and searches for another cell. In this case, although the coverage of the micro base station and its surrounding area belong to the coverage of the macro base station, a problem may occur wherein transmission and reception cannot be performed between the macro user equipment and the macro base station. As described above, an area where the transmission and reception of the macro base station is obstructed (or interrupted) by the micro bas station may be expressed as a coverage hole.

Figure 11:
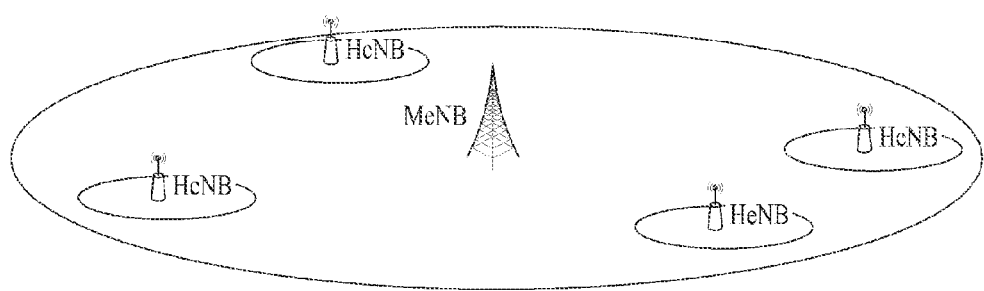
FIG. 11 illustrates a coverage hole.

FIG. 11 illustrates a coverage hole. As shown in FIG. 11, in case multiple micro base stations exist within the coverage of a macro base station, due to an intense interference of the micro base station, a coverage hole, wherein the transmission and reception between the macro-user equipment and the macro base station, may occur.

As described above, in case the conventional inter-cell interference coordination (ICIC) method is applied, and if the user equipment measures the radio link by using an identical method as the conventional method, problems such as the occurrence of the above-described coverage hole cannot be resolved. Therefore, in order to prevent the occurrence of a coverage hole caused by an RLF, which may occur due to inter-cell interference, and to allow the user equipment to measure channel quality of a radio link with more accuracy, when performing CSI measurement, RRM measurement, and so on, the present invention proposes a method of designating a resource area that corresponds to a measurement object, when the user equipment measures a downlink channel quality from the base station to the user equipment. According to the present invention, by having the user equipment perform signaling on a downlink resource (time resource, frequency resource, and/or space resource) that is to be measured, the user equipment may correctly measure the quality of the wireless resource, even when the inter-cell interference is largely applied, problems such as the occurrence of unnecessary RLF may be prevented. The various embodiments proposed in the present invention may be effective in cases wherein, for example, CSG cells exist within the coverage of the macro base station.

In the following description, it will be assumed that 2 cells receive and transmit interference to and from one another for clarity of the description. Hereinafter, a method enabling a cell receiving the interference (also referred to as a victim cell) to signal a downlink resource to a user equipment that is served by the victim cell itself (also referred to as a victim UE) will be described. Herein, the downlink resource is to be measured by the corresponding user equipment. Also, the cell causing the interference may also be expressed as an interfering cell or an aggressor cell. For example, in case of a network wherein the macro base station co-exists with a femto-cell base station, the macro user equipment being located within the coverage of the femto-cell base station may become the victim cell, and the femto cell may become the aggressor cell. Alternatively, in case of a network wherein the macro base station co-exists with a pico-cell base station, the user equipment being served by the pico-cell base station within the extended area of the pico-cell base station may become the victim user equipment, and the macro base station may become the interfering cell.

In the above-described example, description is made under the assumption that the macro base station is the victim cell and that the micro base station is the interfering cell, for simplicity. However, the embodiments of the present invention may also be applied in cases other than the case of the above-described example. For example, when the micro-user equipment measures a downlink signal from the micro base station, the same principle described in the present invention may be applied to a case where an intense interference caused by the macro base station exists. Alternatively, the same principle described in the present invention may be applied to a case where an interference exists between 2 macro cells. More specifically, it will be apparent that, in case an interference can occur between 2 random cells, various embodiments of the present invention can be applied.

Additionally, as a case wherein the principle of the present invention is applicable, an exemplary case of preventing unnecessary RLF from being detected by the victim user equipment, when the effect of the inter-cell interference is large, has been given to describe the above-mentioned example. The present invention will not be limited only to the above-described example. The basic principle of designating a downlink measurement resource may enable the victim user equipment to accurately and efficiently perform downlink measurement, when the inter-cell interference exists, and the basic principle of the present invention may also be applied to a case when a resource for measuring a downlink from a neighboring cell, which is adjacent to a specific user equipment, is designated. More specifically, it will be specified that the method of designating a downlink measurement resource proposed in the present invention can be applied to various downlink measurement schemes of the user equipment.

In other words, the downlink measurement of a user equipment according to the present invention refers to a collective concept including RLM (Radio Link Monitoring) for preventing RLF, a measurement for Channel State Information (CSI) reporting, interference measurement, RRM (Radio Resource Management) measurement, and so on. The RRM measurement may include, for example, the measurements of Reference Signal Received Power (RSRP), Reference Signal Received Quality (RSRQ), Received Signal Strength Indicator (RSSI), and so on.

Designation of Downlink Measurement Resource

The present invention proposes a method of designating resource (time resource, frequency resource, and/or space resource) areas, which are used for the measurement performed by the user equipment, as follows. The designation of the resource that is to be used for the measurement process may be notified to the user equipment by a physical layer signaling or a higher-level layer signaling from the base station.

(1) Designating Subframes

The user equipment may designate downlink measurement to be performed only in a specific subframe. The specific subframe, for example, may be designated as a subframe receiving no downlink transmission from an interfering cell. Additionally, the designated specific subframe may correspond to one or more subframes.

(2) Designating Control Regions/Data Regions

The user equipment may designate downlink measurement to be performed only in a PDCCH region (or control region) or a PDSCH region (or data region) of a random downlink subframe.

(3) Designating Slots

The user equipment may designate downlink measurement to be performed only in a specific slot of a random downlink subframe.

(4) Designating OFDM Symbols

The user equipment may designate downlink measurement to be performed only in a specific PFDM symbol of a random downlink subframe. Herein, the designated OFDM symbol may correspond to one or more OFDM symbols.

(5) Designating Resource Blocks (RBs)

The user equipment may designate downlink measurement to be performed only in a specific RB within a frequency resource. Herein, the designated specific RB may correspond to one or more RBs.

Alternatively, the user equipment may designate a specific RB by using a bitmap method. Also, in order to reduce signaling overhead, signaling may be performed in bundle units (bundles of multiple RBs). Furthermore, signaling may also be performed by using an offset value of a start RB index and an end RB index.

(6) Designating Transmission Antenna Ports

The user equipment may designate downlink measurement to be performed by using only a reference signal being transmitted from a specific antenna port. For example, the user equipment may designate downlink channel quality to be measured by using only a CRS (RE marked as "0" in FIG. 7) allocated to antenna port 0, or the user equipment may designate downlink channel quality to be measured by using only a CRS (REs marked as "0" and "1" in FIG. 7) allocated to antenna ports 0 and 1.

The above-described examples (1) to (6) on the designation of resources used for the downlink measurement performed by the user equipment may be applied independently or in combination. For example, signaling may be made so that downlink measurement can be performed only in a specific RB within the control region of a specific downlink subframe. Alternatively, signaling may be made so that downlink channel quality can be measured by using only the CRS of antenna ports 0 and 1 of the control region within a specific downlink subframe. Further, a combination of (1) designating subframe and (3) designating OFDM symbol may be applied, resulting in that downlink measurement may be performed for certain OFDM symbol(s) in certain downlink subframe(s) or for all OFDM symbols in certain downlink subframe(s). Furthermore, when multiple combinations are being applied, the user equipment may designate a downlink measurement area in resource element (RE) units. Accordingly, in case the effect of the inter-cell interference is large, the base station may designate a downlink resource area (e.g., a resource area that is not influenced by an interference caused by another cell may be designated) in which the user equipment is to measure channel quality. Thus, the radio link between the base station and the user equipment can be accurately measured. (For example, the radio link may be maintained by preventing the RLF from being unnecessarily detected.) Alternatively, by performing downlink measurement in a portion having no downlink signal transmitted from an interfering cell, which is adjacent to the victim user equipment, the victim user equipment may be capable of accurately calculating the CSI or may be capable of accurately performing RRM measurement, such as RSRP, RSSI, RSRQ, and so on.

Detailed examples of designating a resource that is to be used for the downlink measurement performed by the user equipment according to the present invention will now be described with reference to FIG. 12 and FIG. 13.

Figure 12:
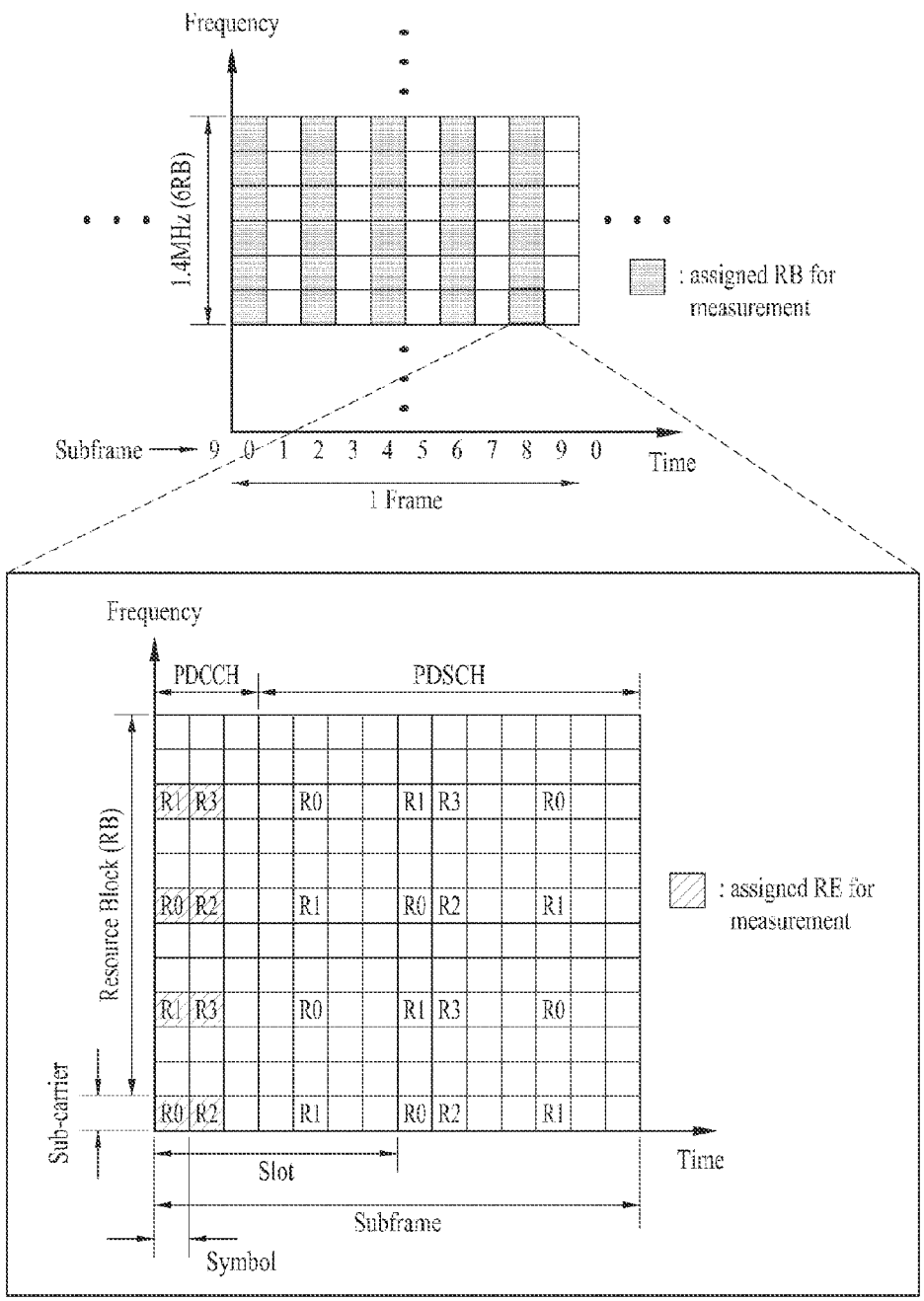
FIG. 12 to FIG. 18 illustrate examples of resource used for a downlink measurement of a user equipment according to the present invention.
Figure 13:
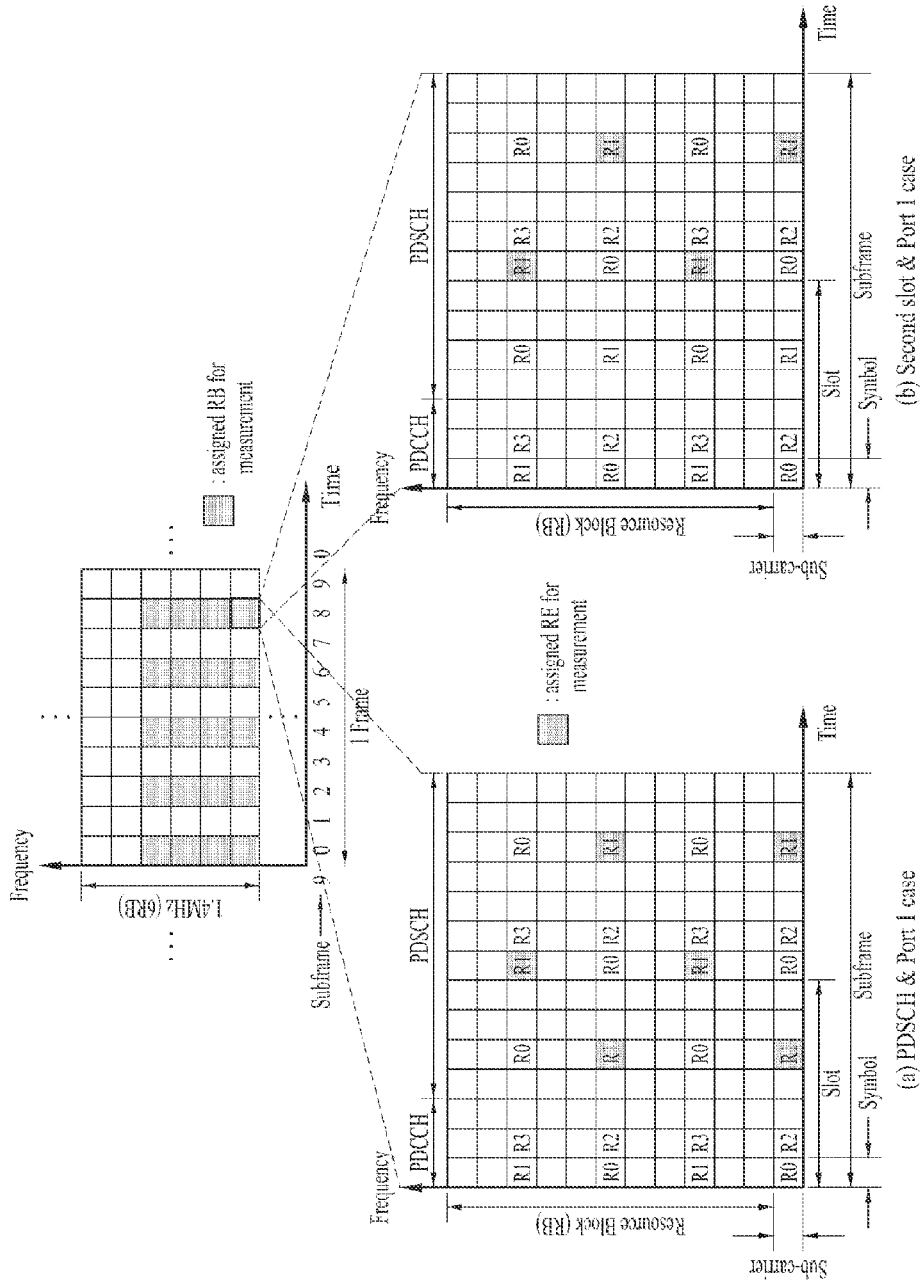

The embodiment of the present invention shown in FIG. 12 describes a case wherein downlink measurement is designated to be performed only in an even-numbered subframe of a channel bandwidth of 1.4 MHz (a whole RB (6RB) is used within the bandwidth of 1.4 MHz), and wherein downlink measurement is designated to be performed by using only the CRS located in the control region (PDCCH region) within each RB (or the CRS existing in OFDM symbol indexes 0 and 1). Herein, the antenna port through which the user equipment is to perform downlink measurement may also be additionally designated. For example, in case downlink measurement is designated to be performed only with respect to antenna port 0, signaling may be made so that downlink measurement using only 2 REs (REs marked as R0 in FIG. 12) for each RB can be performed.

The embodiment shown in FIG. 13(a) and FIG. 13(b) is similar to the embodiment shown in FIG. 12 in that the downlink measurement is performed only in an even-numbered subframe. However, the embodiment shown in FIG. 13(a) and FIG. 13(b) describes a case wherein the downlink measurement is designated to be performed only with respect to 4RB of the 1.4 MHz channel bandwidth (6RB). This may correspond, for example, to a case where a victim user equipment designates a downlink frequency resource that is to be measured, when the victim user equipment uses the lower 4RB of the 6RB so as to perform transmission, and when the interfering cell uses the upper 2RB of the 6RB so as to perform transmission (or including a case when the interfering cell uses 2RB or more so as to perform transmission). Herein, the embodiment of FIG. 13(a) shows a case where downlink measurement is performed only with respect to a CRS allocated to antenna port 1 in a data region (PDSCH region) of a downlink subframe. The embodiment of FIG. 13(b) shows a case where downlink measurement is performed only with respect to a CRS allocated to antenna port 1 in a second slot of a downlink subframe. Alternatively, the designation of downlink measurement resources shown in FIG. 13(a) and FIG. 13(b) may also be expressed as a designation of a CRS RE existing in a specific OFDM symbol of a downlink subframe. For example, the case shown in FIG. 13(a) may correspond to a case where the downlink measurement is designated to be performed only on the CRS allocated to antenna port 1 at OFDM symbol indexes 4, 7, and 11. And, the case shown in FIG. 13(b) may correspond to a case where the downlink measurement is designated to be performed only on the CRS allocated to antenna port 1 at OFDM symbol indexes 7 and 11.

In the above-described example, a case where the user equipment uses the CRS so as to measure the downlink channel quality has been described, in order to clearly describe the principle of the present invention. However, the scope of the present invention will not be limited only to the above-described example. The above-described details may be equally applied to a process of signaling a resource area in which various downlink measurements (measurement for RLM, CSI measurement, interference measurement, RRM measurement) are to be performed, the various downlink measurements being performed by the user equipment. More specifically, according to the present invention, signaling may be performed on a specific time resource (e.g., subframe, control region/data region, slot or OFDM symbol), a specific frequency resource (e.g., RB), and/or a specific space resource (e.g., antenna port) with respect to which the various downlink measurements are to be performed by the user equipment.

Designating Resource for Downlink CSI Measurement

Hereinafter, a method of designating a downlink measurement resource corresponding to a case when the user equipment computes channel state information (CSI) according to an embodiment of the present invention will be described in detail.

As one of many enhanced inter-cell interference coordination (enhanced ICIC or eICIC) methods, an MBSFN subframe may be configured from a cell causing interference (interfering cell). As a general rule, the MBSFN subframe corresponds to a subframe for MBMS (multimedia Broadcast and Multicast Service), and MBMS refers to a service transmitting the same signal from multiple cells at the same time. A downlink subframe that is configured as the MBSFN subframe may transmit CRS only from an OFDM symbol position, which transmits the control channel, and the CRS is not transmitted from the data region. Furthermore, it is assumed that a boundary of a downlink subframe of an interfering cell and a boundary of a downlink subframe of a cell receiving interference (victim cell) are aligned. Accordingly, the cell receiving the inference (victim cell) receives (or is influenced by) the interference caused by the CRS of the interfering cell only in the control region (PDCCH region), and the victim cell does not receive (or is not influenced by) the interference caused by the CRS of the interfering cell in the data region (PDSCH region). In this case, when the victim user equipment computes and reports the CSI for PDSCH transmission from the victim cell, the influence of the CRS interference caused by the interfering cell is not required to be considered. Also, in order to enable the victim user equipment to compute and report a more accurate CSI, the CSI may be computed by using only the CRS located in the PDSCH region (i.e., CRS received from the victim cell) of the corresponding subframe (downlink subframe of the victim cell being aligned with a downlink subframe configured by the interfering cell as an MBSFN subframe).

In order to enable the user equipment to perform such downlink measurement operations, the base station may designate and signal the corresponding user equipment to perform downlink measurement only in the data region. More specifically, the above-described method number (2), which designates the resource that is used for the downlink measurement process, may be applied.

Additionally, when the user equipment computes the CSI, an SINR of a received signal may be measured. Herein, in order to compute the SINR, a signal element and an interference element (or interference and noise elements) should be estimated. As described above, in case the interfering cell configures a specific downlink subframe as an MBSFN subframe and in case the interfering cell does not transmit data and CRS in the data region (or in case the interfering cell transmits a null resource element (Null RE)), in a downlink subframe of the victim cell that is aligned with the specific downlink subframe of the interfering cell, the victim user equipment may perform interference estimation by using only the CRS of the data region. (For example, the victim user equipment extracts a CRS of the data region within the downlink subframe that is received from the victim cell. Then, the victim user equipment may measure the remaining elements as interference elements). At this point, the process of measuring the signal elements may be performed by using the downlink signals of both the data region and the control region, or the process of measuring the signal elements may be performed by using only the downlink signal of a specific region (e.g., data region).

Although an example of the interfering cell configuring an MBSFN subframe has been given to describe the above-described embodiment of the present invention, the present invention will not be limited only to the example given herein. In other words, the same principle may be applied to normal subframes, ABSs (Almost Blank Subframes), and ABS-with-MBSFN. More specifically, in order to allow the user equipment to measure downlink CSI with more accuracy, the base station may designate and signal a resource area in which the downlink measurement is to be performed. Herein, the ABS refers to a case wherein the CRS is transmitted only from the control region and data region of the downlink subframe, and wherein the PDCCH and the PDSCH are not transmitted. However, even in the ABS, downlink channels, such as PBCH, PSS, SSS, and so on, and downlink signals may be transmitted. Furthermore, ABS-with-MBSFN refers to a case wherein even the CRS of the data region is not transmitted from the above-described ABS.

In the above-described examples, it is described that the CRS is used for the downlink CSI measurement. However, the principle of the present invention may also be equally applied in a case of using CSI-RS in order to measure downlink CSI. More specifically, in order to enable the user equipment to measure downlink CSI with more accuracy based upon a CSI-RS transmitted from the base station, which has an extended antenna configuration, the base station may designate and signal a resource area in which the downlink measurement process is to be performed.

According to another embodiment of the present invention, description will be made on a method of designating a downlink measurement resource of a victim user equipment, in case the number of transmission antennae of the interfering cell is smaller than the number of transmission antennae of the victim cell (or in case the number of transmission antennae of the interfering cell is limited). In this case, the victim user equipment may perform interference measurement by using the CRS of an antenna port that is not used by the interfering cell. Accordingly, the victim user equipment may apply the measured result to CSI computation. Most particularly, in case the interfering cell configures a specific downlink subframe as the ABS, and when the victim user equipment uses the CSI-RS to compute the downlink CSI, the interference may be measured by using the CRS of an antenna port that is not used by the interfering cell in a downlink subframe from which the CSI-RS is not transmitted.

In the above-described examples, a case wherein the user equipment measures the downlink CSI has been described in order to clearly describe the principle of the present invention. However, the scope of the present invention will not be limited only to the case described in the example presented herein. The above-described details may also be equally applied to a process of signaling a resource area, wherein various downlink measurement processes (measurement for RLM, CSI measurement, interference measurement, RRM measurement), which are performed by the user equipment, are to be performed. More specifically, according to the present invention, signaling may be performed on a specific time resource (e.g., subframe, control region/data region, slot or OFDM symbol), a specific frequency resource (e.g., RB), and/or a specific space resource (e.g., antenna port) with respect to which the various downlink measurements are to be performed by the user equipment.

Detailed examples of designating a downlink measurement respective to inter-cell interference coordination according to the present invention will now be described with reference to FIG. 14 to FIG. 18.

Figure 14:
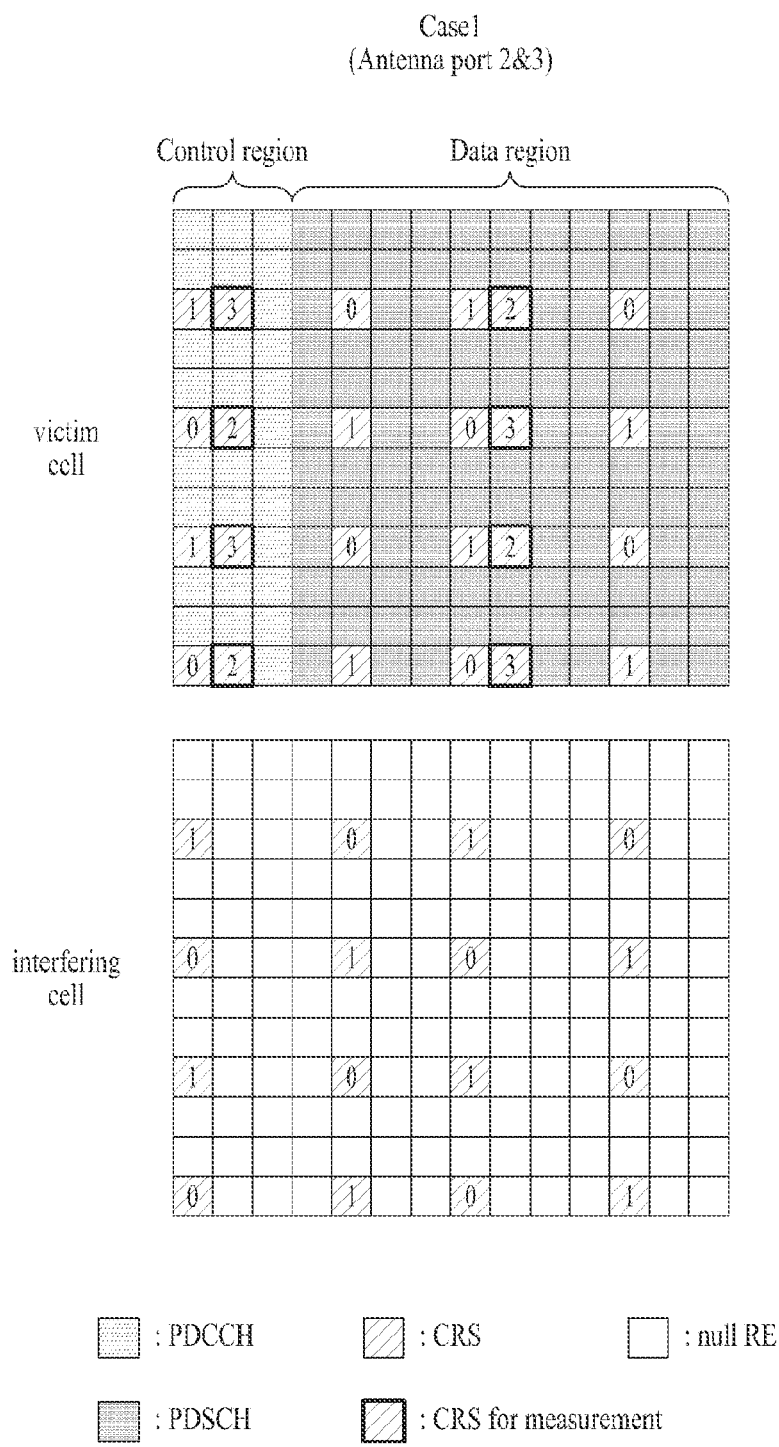

FIG. 14 illustrates an example of designating a resource, on which downlink measurement is to be performed, from a victim cell being influenced by interference to a victim user equipment, in case downlink subframe boundaries of two cells exchanging interference are identical, and in case CRS transmission resource elements of two cells coincide. In the example shown in FIG. 14, the antenna configuration of the victim cell corresponds to 4 transmission antennae, and the antenna configuration of the interfering cell corresponds to 2 transmission antenna. Additionally, the example of FIG. 14 shows a case wherein the downlink subframe of the interfering cell is configured as an ABS. Accordingly, a collision may occur between the CRS being allocated to antenna ports 0 and 1 of the interfering cell and the CRS being allocated to antenna ports 0 and 1 of the victim cell. In this case, the victim cell may signal the victim user equipment to perform downlink measurement by using only the CRS being allocated to antenna ports 2 and 3 in the downlink subframe.

Figure 15:
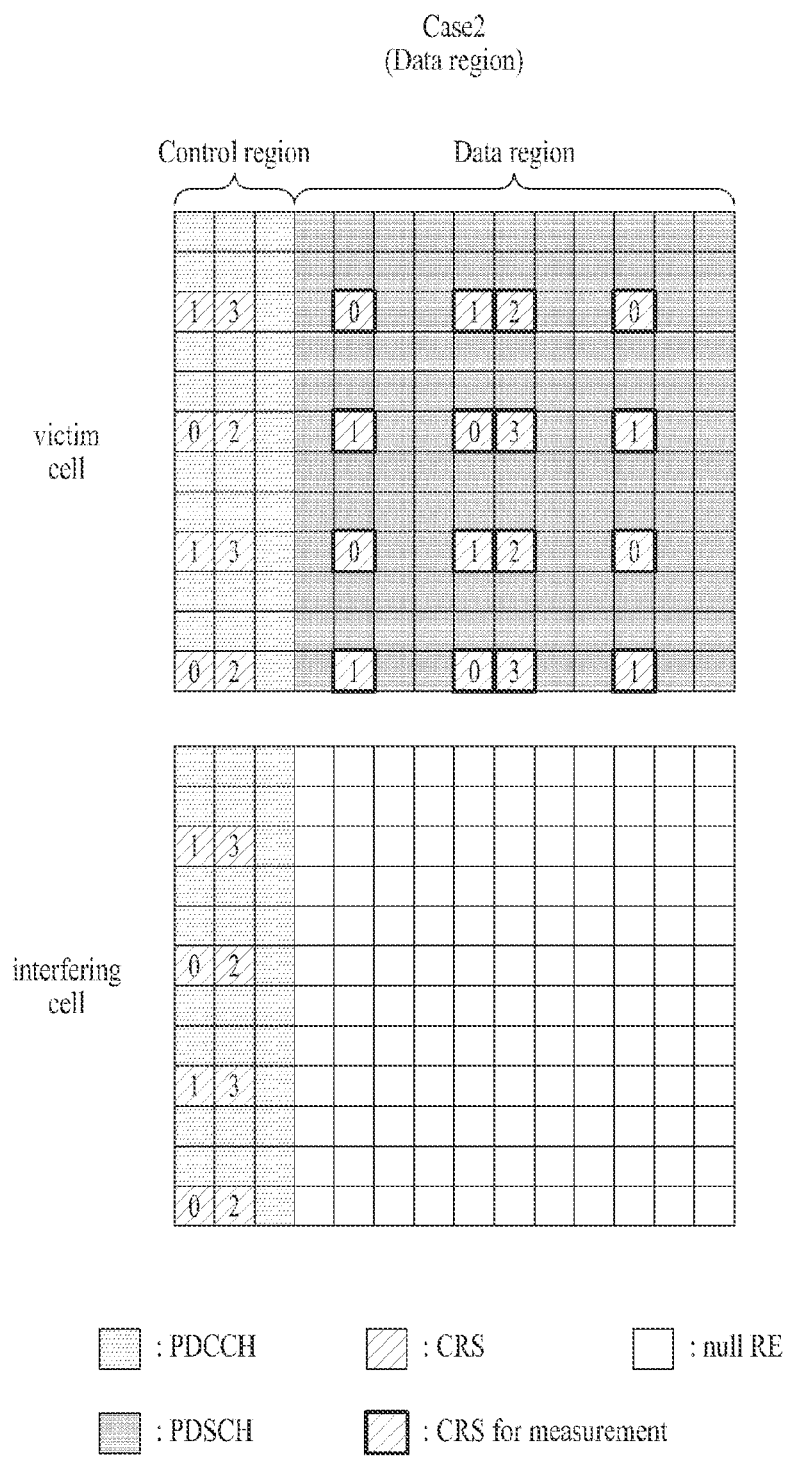

FIG. 15 illustrates an example of designating a resource, on which downlink measurement is to be performed, from a victim cell being influenced by interference to a victim user equipment, in case downlink subframe boundaries of two cells exchanging interference are identical, and in case CRS transmission resource elements of two cells coincide. In the example shown in FIG. 15, the antenna configuration of both the victim cell and the interfering cell corresponds to 4 transmission antennae. Additionally, the example of FIG. 15 shows a case wherein the downlink subframe of the interfering cell is configured as an MBSFN subframe. Accordingly, a collision may occur between the CRS of the control region of a downlink subframe of the interfering cell and the CRS of the control region of a downlink subframe of the victim cell. In this case, the victim cell may signal the victim user equipment to perform downlink measurement by using only the CRS of the data region in the downlink subframe.

Figure 16:
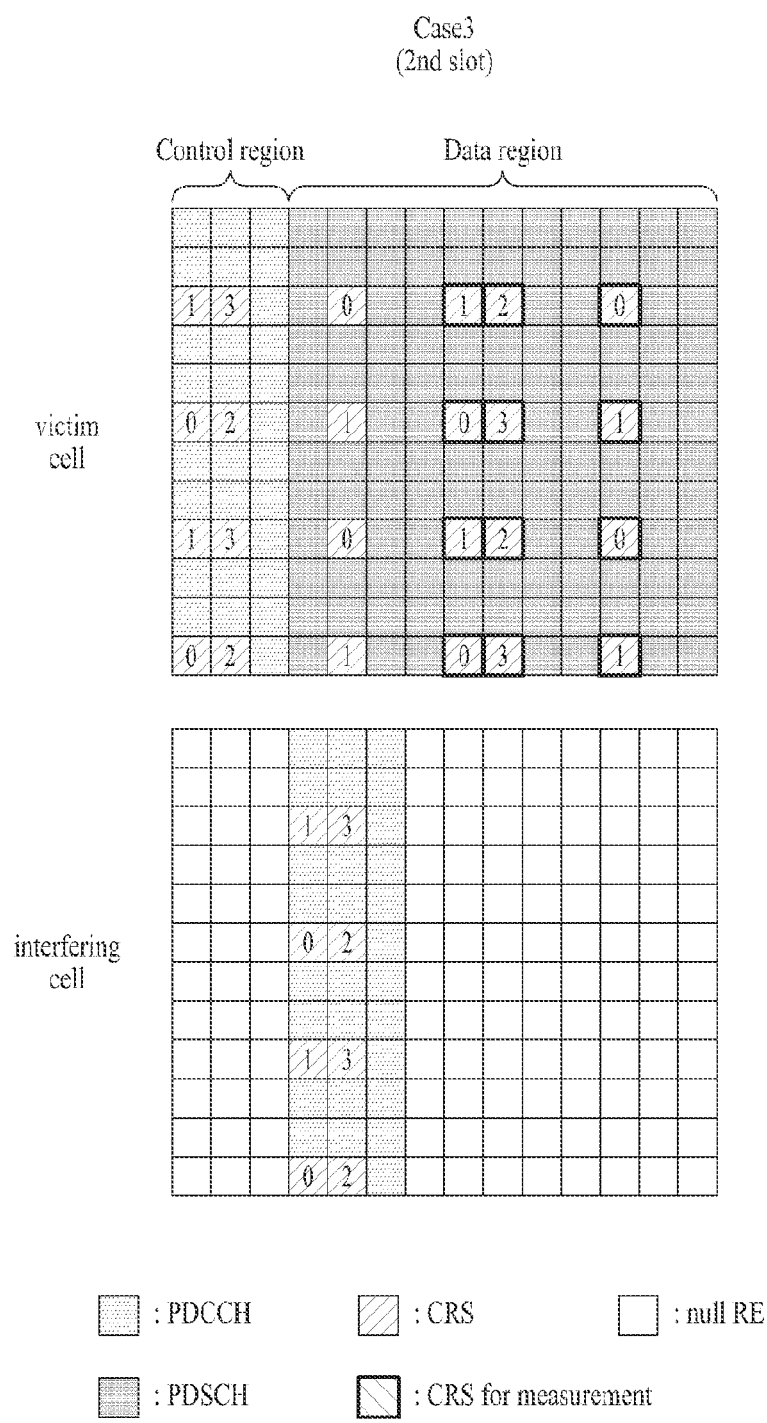

FIG. 16 illustrates an example of designating a resource, on which downlink measurement is to be performed, from a victim cell being influenced by interference to a victim user equipment, in case downlink subframe boundaries of two cells exchanging interference are shifted to an offset of 3 OFDM symbols. By shifting the subframe boundaries of two cells to an offset of 3 OFDM symbols, the PDCCH region of the victim user equipment may be protected or CRC collision may be prevented. In the example shown in FIG. 16, the antenna configuration of both the victim cell and the interfering cell corresponds to 4 transmission antennae. Additionally, the example of FIG. 16 shows a case wherein the downlink subframe of the interfering cell is configured as an MBSFN subframe. Accordingly, a portion of the PDSCH region of the victim cell may be influenced by an interference caused by the PDCCH and CRS of the interfering cell. In this case, the victim cell may signal the victim user equipment to perform downlink measurement by using only the CRS of a second slot in the downlink subframe. Alternatively, if the last 3 OFDM symbols of a previous subframe of the interfering cell (first 3 OFDM symbols in the bottom drawing of FIG. 16) do not influence the PDCCH region of the victim cell at all, the victim cell may designate the victim user equipment to also use the CRS of the PDCCH region so as to downlink measurement.

Figure 17:
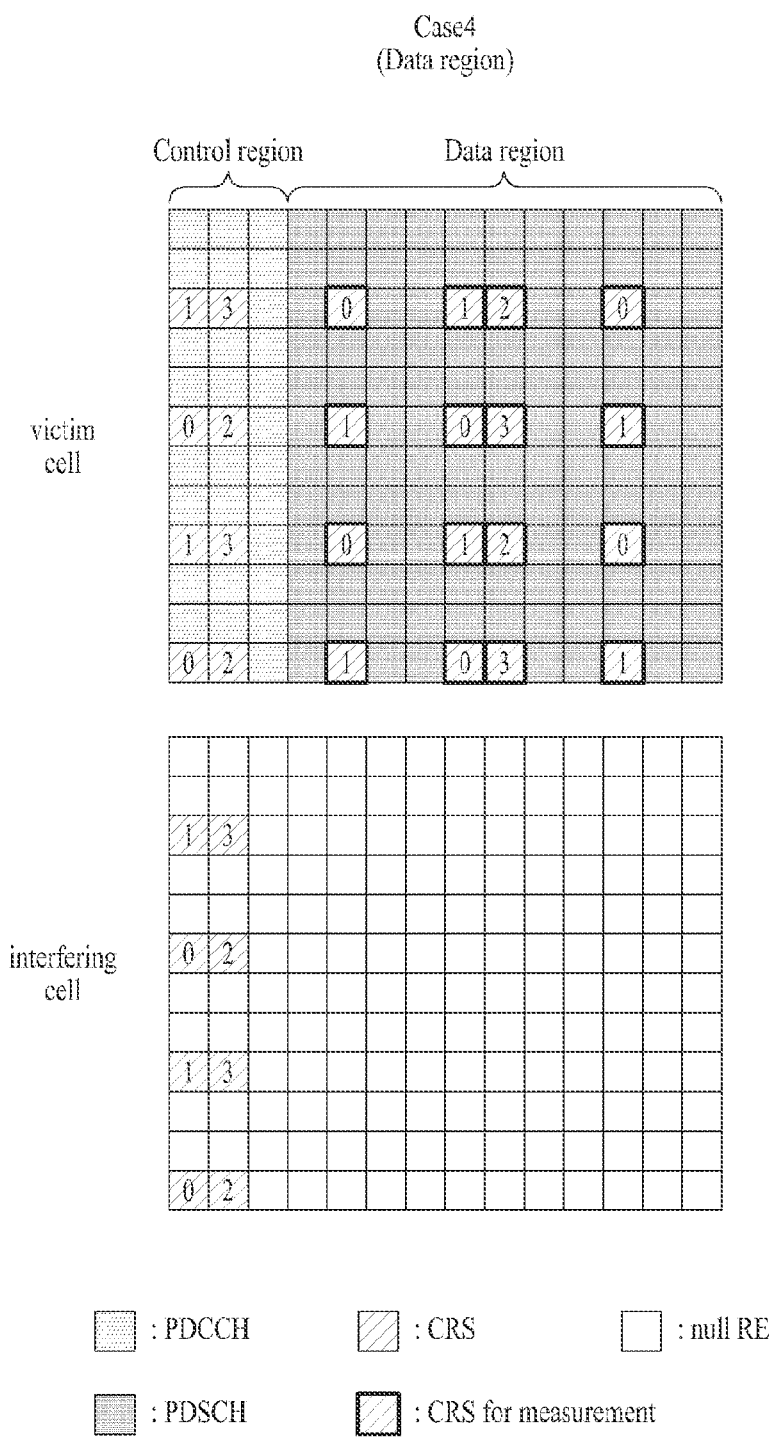

FIG. 17 illustrates an example of designating a resource, on which downlink measurement is to be performed, from a victim cell being influenced by interference to a victim user equipment, in case downlink subframe boundaries of two cells exchanging interference are identical, and in case CRS transmission resource elements of two cells coincide. In the example shown in FIG. 17, the antenna configuration of both the victim cell and the interfering cell corresponds to 4 transmission antennae. Additionally, the example of FIG. 17 shows a case wherein the downlink subframe of the interfering cell is configured as an ABS-with-MBSFN subframe. Accordingly, a collision may occur between the CRS of the control region of a downlink subframe of the interfering cell and the CRS of the control region of a downlink subframe of the victim cell. In this case, the victim cell may signal the victim user equipment to perform downlink measurement by using only the CRS of the data region in the downlink sub frame.

Figure 18:
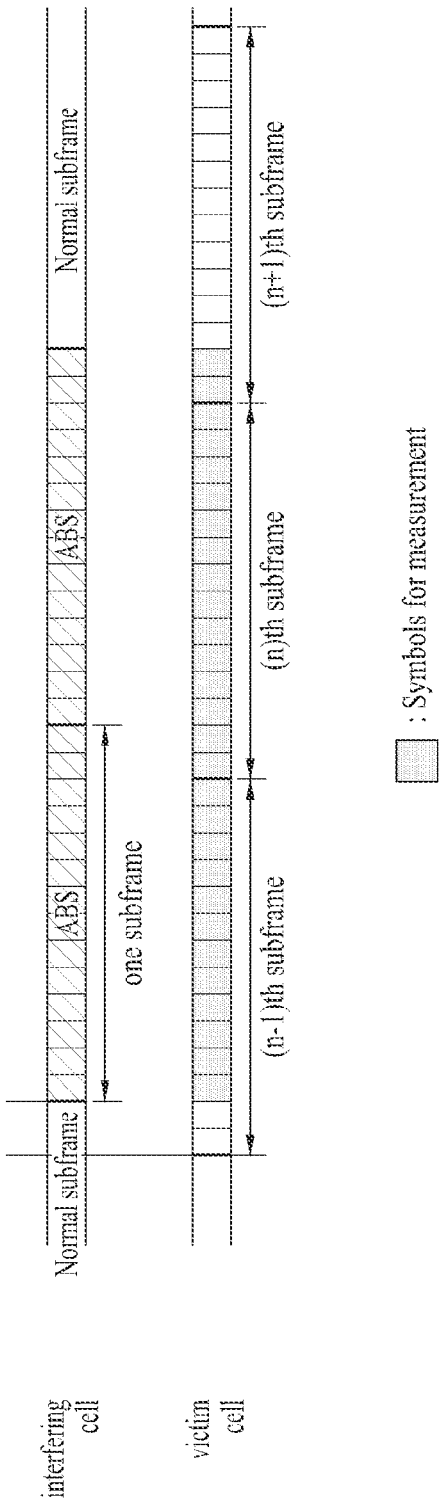

FIG. 18 illustrates an example of designating a resource, on which downlink measurement is to be performed, from a victim cell being influenced by interference to a victim user equipment, in case downlink subframe boundaries of two cells exchanging interference are shifted to 2 OFDM symbols. By shifting the subframe boundaries of two cells, the PDCCH region of the victim user equipment may be protected or CRC collision may be prevented. In the example shown in FIG. 18, the interfering cell configures two consecutive subframes as ABS. In the example shown in FIG. 18, the downlink measurement may be designated to be performed in a downlink subframe symbol of the victim cell that coincides with the ABS of the interfering cell. For example, in the example of FIG. 18, in case the entire nth downlink subframe of the victim cell is included in the ABS section of the interfering cell, the CRS of the entire subframe may be used for the measurement process in the nth downlink subframe of the victim cell. Additionally, the CRS of the PDCCH region (or the CRS of an available OFDM symbol) may be used for the measurement process in the n−1th downlink subframe of the victim cell, and the CRS of the PDCCH region (or the CRS of an available OFDM symbol) may be used for the measurement process in the n+1th downlink subframe of the victim cell.

In the examples shown in FIG. 14 to FIG. 18, the downlink measurement may include all of the measurement for RLM, CSI measurement, interference measurement, RRM measurement, and so on.

Signaling Downlink Measurement Resource Designation

Hereinafter, description will be made in detail on a signaling method that can be applied to the above-described various methods, such as designating a resource on which the downlink measurement is performed, in case of an inter-cell interference coordination (ICIC). The base station may notify the user equipment of information indicating the resource (time resource, frequency resource, and/or space resource) area, which is used for the downlink measurement of the user equipment, by performing physical layer signaling or higher-level layer signaling.

For example, an RRCConnectionReconfiguration message, which is defined in the conventional 3GPP LTE standard document (e.g., TS36.331), may be considered to be used as a message for signaling the measurement process, which is performed by the user equipment. As shown in Table 1 below, measurement objects may be signaled through a measConfig information element (IE) included in the presently defined RRCConnectionReconfiguration message.

TABLE 1

RRCConnectionReconfiguration message

```
-- ASN1START

RRCConnectionReconfiguration ::=          SEQUENCE {
    rrc-TransactionIdentifier              RRC-TransactionIdentifier,
    criticalExtensions                     CHOICE {
        c1                                 CHOICE{
            rrcConnectionReconfiguration-r8    RRCConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture           SEQUENCE { }
    }
}

RRCConnectionReconfiguration-r8-IEs      ::= SEQUENCE {
    measConfig                             MeasConfig                              OPTIONAL,   -- Need ON
    mobilityControlInfo                    MobilityControlInfo                     OPTIONAL,   -- Cond HO
    dedicatedInfoNASList                   SEQUENCE (SIZE(1..maxDRB)) OF
                                           DedicatedInfoNas                        OPTIONAL,   -- Cond nonHO
    radioResourceConfigDedicated           RadioResourceConfigDedicated            OPTIONAL,   -- Cond HO-toEUTRA
    securityConfigHO                       SecurityConfigHO                        OPTIONAL,   -- Cond HO
    nonCriticalExtension-v9x0              RRCConnectionReconfiguration-v9x0-IEs   OPTIONAL    -- Need ON
}

RRCConnectionReconfiguration-v9x0-IEs    ::= SEQUENCE {
    reportProximityConfig-r9               ReportProximityConfig-r9                OPTIONAL    -- Need ON
    nonCriticalExtension                   SEQUENCE { }                            OPTIONAL    -- Need OP
}

SecurityConfigHO ::=                      SEQUENCE {
```

TABLE 1-continued

MeasConfig information element

```
-- ASN1START

MeasConfig ::=                      SEQUENCE {
    -- Measurement objects
    measObjectToRemoveList          MeasObjectToRemoveList          OPTIONAL,    --Need ON
    measObjectToAddModList          MeasObjectToAddModList          OPTIONAL,    --Need ON
    -- Reporting configurations
    reportConfigToRemoveList        ReportConfigToRemoveList        OPTIONAL,    --Need ON
    reportConfigToAddModList        ReportConfigToAddModList        OPTIONAL,    --Need ON
    -- Measurement identities
    measIdToRemoveList              MeasIdToRemoveList              OPTIONAL,    --Need ON
    measIdToAddModList              MeasIdToAddModList              OPTIONAL,    --Need ON --Other parameters
    quantityConfig                  QuantityConfig                  OPTIONAL,    --Need ON
    measGapConfig                   MeasGapConfig                   OPTIONAL,    --Need ON
    s-Measure                       RSRP-Range                      OPTIONAL,    --Need ON
    preRegistrationInfoHRPD         PreRegistrationInfoHRPD         OPTIONAL,    --Need OF
    speedStatePars          CHOICE {
        release                         NULL,
        setup                           SEQUENCE {
            mobilityStateParameters         MobilityStateParameters,
            timeToTrigger-SF                SpeedStateScaleFactors
        }
    }                                                               OPTIONAL,    --Need ON
}

MeasIdToRemoveList ::=              SEQUENCE (SIZE (1..maxMeasId)) OF MeasId

MeasObjectToRemoveList ::=          SEQUENCE (SIZE (1..maxObjectId)) OF MeasObjectId ReportConfigToRemoveList ::=        SEQUENCE (SIZE (1..maxReportConfigId)) OF ReportConfigId

-- ASN1STOP
```

MeasObjectEUTRA information element

```
-- ASN1START

MeasObjectEUTRA ::=                 SEQUENCE {
    carrierFreq                         ARFCN-ValueEUTRA,
    allowedMeasBandwidth                AllowedMeasBandwidth,
    presenceAntennaPort1                PresenceAntennaPort1,
    neighCellConfig                     NeighCellConfig,
    offsetFreq                          Q-OffsetRange                   DEFAULT dB0,
    -- Neighbour cell list
    cellsToRemoveList                   CellIndexList                   OPTIONAL,    -- Need ON
    cellsToAddModList                   CellsToAddModList               OPTIONAL,    -- Need ON
```

TABLE 1-continued

```
    -- Black list
        blackCellsToRemoveList              CellIndexList              OPTIONAL,    -- Need ON
        blackCellsToAddModList              BlackCellsToAddModList     OPTIONAL,    -- Need ON
        cellForWhichToReportCGI             PhysCellId                 OPTIONAL,    -- Need ON
        ...
    }

CellsToAddModList ::=                       SEQUENCE (SIZE (1..maxCellMeas)) OF CellsToAddMod CellsToAddMod ::=       SEQUENCE {
        cellIndex                           INTEGER (1..maxCellMeas),
        physCellId                          PhysCellId,
        cellIndividualOffset                Q-OffsetRange
}

BlackCellsToAddModList ::=                  SEQUENCE (SIZE (1..maxCellMeas)) OF BlackCellsToAddMod BlackCellsToAddMod ::=  SEQUENCE {
        cellIndex                           INTEGER (1..maxCellMeas),
        physCellIdRange                     PhysCellIdRange
}

-- ASN1STOP
```

Referring to Table 1, according to the definitions in the current LTE standard, the user equipment may be informed of the measurement information through the MeasObjectEUTRA IE. According to the current LTE standard, since measurement is performed on a full bandwidth of each cell, an allowedMeasBandwidth within the MeasObjectEUTRA is defined to have a full RB signaled for each bandwidth (e.g., 6RB for a 1.4 MHz bandwidth, 15RB for a 3 MHz bandwidth, etc.).

According to what is proposed in the present invention, in the aspect of inter-cell interference coordination (ICIC), in order to have the user equipment measure channel quality by using only a portion of the downlink resource (e.g., a portion of the RB), additional information is required to be defined in the MeasObjectEUTRA IE, which is defined in a conventional RRC message.

For example, a field having the size of 1 bit may be added, in case PDCCH/PDSCH is differentiated and designated as the resource on which downlink measurement is to be performed, or in case $1^{st}$ slot/$2^{nd}$ slot is differentiated and designated as the resource on which downlink measurement is to be performed. Also, in case a specific RB is designated as the resource on which downlink measurement is to be performed, a bit field may be configured in accordance with a signaling method using a bitmap, a signaling method performed by bundling multiple RBs, a signaling method directly signaling a starting point and an ending point of an RB, or a signaling method using an offset value of a starting RB index and an offset value of an ending RB index. Similarly, a field designating a specific antenna port or OFDM symbol as the resource, on which the downlink measurement is to be performed, may also be configured. As described above, a signaling method for directing a resource, on which downlink measurement is to be performed, to a user equipment may be configured independently or in combination.

Hereinafter, description will be made on yet another signaling method that can be applied to the above-described various methods of designating a resource on which the downlink measurement is performed, in case of an inter-cell interference coordination (ICIC).

The interfering cell may signal to the victim cell whether its subframe configuration corresponds to a normal subframe or an ABS (herein, ABS includes ABS-with-MBSFN) by using a bitmap method. Herein, the bitmap may be signaled in the form of a combination of 2 bitmaps ($1^{st}$ bitmap and $2^{nd}$ bitmap). The $1^{st}$ bitmap corresponds to a bitmap notifying which subframe is being configured as an ABS, and the $1^{st}$ bitmap also performs a function of notifying which subframe can be converted to a normal subframe in a later process. The $2^{nd}$ bitmap corresponds to a bitmap notifying which subframe is to be used for the measurement in the victim cell, and the $2^{nd}$ bitmap may be configured as a subset of the $1^{st}$ bitmap. It is proposed in the present invention that the interfering cell should restrict the subframe being signaled through the $2^{nd}$ bitmap, i.e., the subframe that is to be used for the measurement of the user equipment, which belongs to the victim cell, to an ABS-with-MBSFN subframe (i.e., a subframe transmitting only the CRS of the control region). This indicates that the $2^{nd}$ bitmap consists of subsets of all subframes being configured as ABS-with-MBSFN subframes by the interfering cell.

In order to perform a flexible measurement, the user equipment may be set to perform measurement only in a subframe, which is designated as the ABS-with-MBSFN subframe by the interfering cell. In this case, by using the signaling method that enables downlink measurement to be performed only on the above-described specific resource, measurement of a region having CRS interference existing therein and measurement of a region having no CRS interference existing therein may be flexibly applied, whenever required, based upon the decision of the serving cell (victim cell).

Designating Resources for RRM Measurement

The measurement for RRM may be classified, for example, as Reference Signal Received Power (RSRP), Reference Signal Received Quality (RSRQ), and so on. Herein, the RSRQ may be measured by a combination of an RSRP and an E-UTRA Carrier Received Signal Strength Indicator (RSSI).

Hereinafter, a method for applying the above-described various embodiments of measurement resource designation (or measurement restriction) to RRM measurement will be described in detail.

In the conventional 3GPP LTE standard document (e.g., TS36.214), it is defined that "E-UTRA Carrier Received Signal Strength Indicator (RSSI), comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise etc." In other words, the power of an OFDM symbol, wherein the CRS for antenna port 0 is transmitted, may be referred to as RSSI.

As described above, as an enhanced ICIC (eICIC) method, a method of having the interfering cell configure an ABS or ABS-with-MBSFN subframe, in order to reduce the influence of a dominant interference, and having the victim cell perform measurement and/or transmission in the corresponding subframe may be applied. This corresponds to an example of an inter-cell interference coordination method using a time-division multiplexing (TDM) scheme.

However, the solution using the above-described TDM scheme is disadvantageous in that the dominant interference affects only a specific resource element (RE) or a specific OFDM symbol. Also, depending upon which subframe is configured by the interfering cell as the ABS subframe or as the ABS-with-MBSFN subframe in order to reduce interference, the amount (or level) of interference may be largely varied. Considering the fact that the eICIC method is used to avoid the influence of a dominant interference on the victim cell, it is preferable to perform a measurement having no interference in a subframe, wherein the solution using the above-described TDM scheme is applied. Furthermore, it is important to perform measurement so that a consistent interference level can be maintained in order to facilitate compensations made by the base station.

Figure 19:
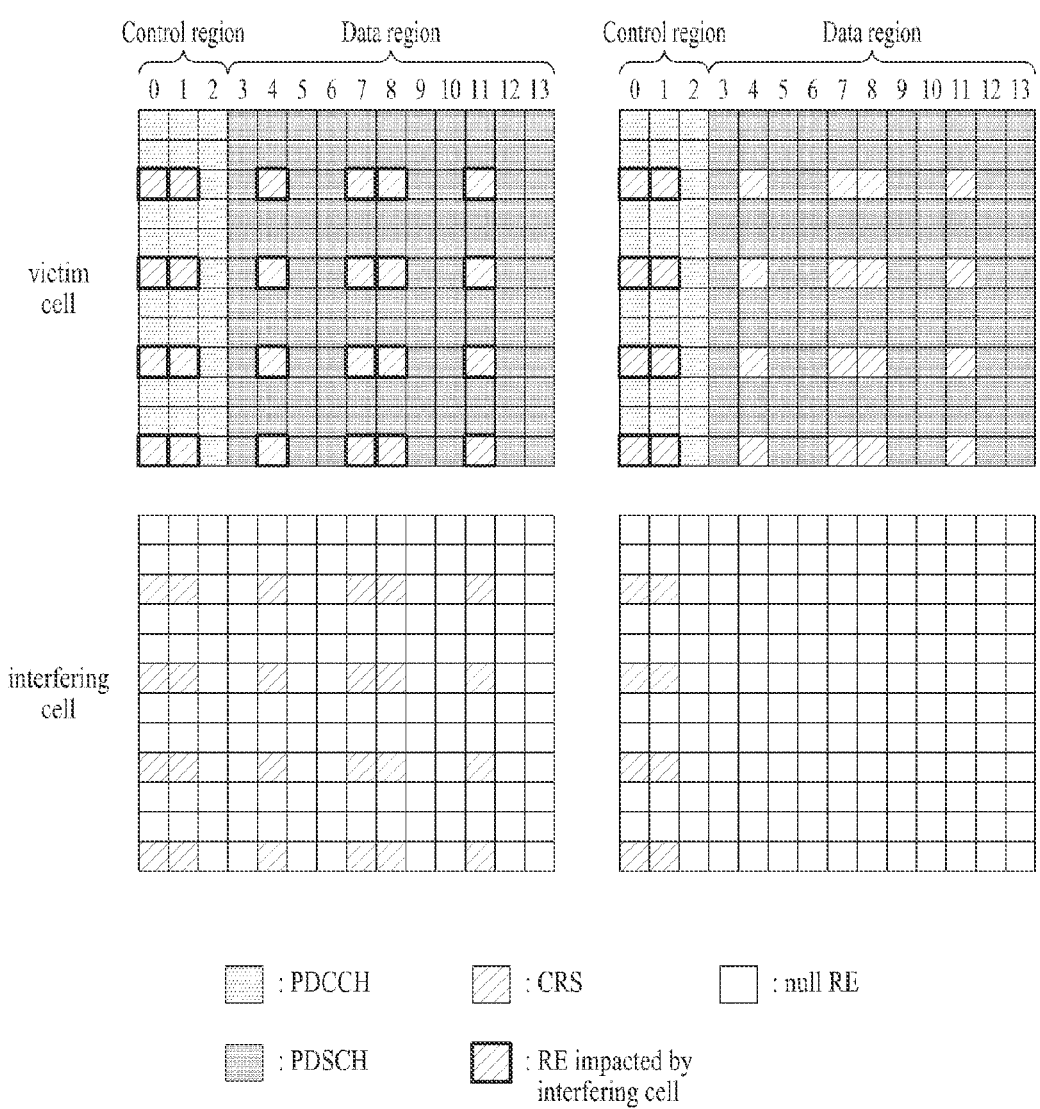
FIG. 19 illustrates a change in amount of interference according to interference cell subframe settings.

FIG. 19 illustrates a change in amount of interference according to interference cell subframe settings. For example, in the example shown in FIG. 19, the interfering cell may correspond to a macro base station, and the victim cell may correspond to a pico base station. However, the present invention will not be limited to the example given herein. More specifically, the same principle may be applied to two random cells exchanging interference to and from one another, which will hereinafter be described in detail.

As shown in the example of FIG. 19(a) (although the example shows a case where the CRS of the victim cell collides with the CRS of an aggressor cell, it will be apparent that the present invention can be applied even in a case where there is no CRS collision), in case the subframe of the interfering cell is configured as an ABS subframe, all CRSs of the victim cell are influenced by the interference. Meanwhile, as shown in the example of FIG. 19(b), in case the subframe of the interfering cell is configured as an ABS-with-MBSFN subframe, only the CRSs included in the control region of the victim cell are influenced by the interference. Therefore, the amount of interference is largely increased in the case where the subframe of the interfering cell is configured as an ABS subframe (FIG. 19(a)) as compared to the case where the subframe of the interfering cell is configured as an ABS-with-MBSFN subframe (FIG. 19(b)). Furthermore, it will be apparent that the increase in interference with respect to a change in the subframe configuration of the interfering cell is concentrated in a specific RE or a specific OFDM symbol.

As described above, since the interference amount respective to the victim cell can be largely reduced when the downlink subframe of the interfering cell is configured as an ABS-with-MBSFN subframe, the performance of the victim cell may be enhanced. However, since a restriction in the MBSFN configuration exists (e.g., in one radio frame, subframes of subframe indexes 0, 4, 5, and 9 cannot be configured as MBSFN subframes), all of the subframe cannot always be used as MBSFN subframes. Therefore, in an ABS pattern, which is signaled by the interfering cell to the victim cell, ABS subframes may co-exist with ABS-with-MBSFN subframes. And, in this case, due to a fluctuation in interference, a problem of decreased measurement accuracy and imprecision in measurement may occur.

In order to resolve the above-described problem, a method of having the base station designate and signal a resource, with respect to which downlink measurement of the user equipment is to be performed, will now be described. The embodiments of the present invention may be applied to both a measurement using REs to which CRS is transmitted and a measurement on OFDM symbols. Furthermore, in the following description, the downlink measurement includes all of CSI measurement, interference measurement, measurement for RLM, RRM measurement (measurements of RSRP, RSSI, etc.).

For example, the victim cell enables the victim user equipment to perform downlink measurement only in a subframe configured as an ABS-with-MBSFN subframe by the interfering cell, and, at this point, the victim cell may designate and signal the measurement to be performed only in the data region (PDSCH region) of the downlink subframe. Accordingly, since the downlink measurement of the victim cell can be performed in a region where only the Null RE is transmitted (i.e., where nothing is transmitted) from the interfering cell, the influence of the dominant interference caused by the interfering cell may be eliminated. In other words, a downlink resource of a victim cell, which is not substantially influenced by the interfering cell, may be designated and signaled as the downlink measurement object of the victim cell.

As another example, in case the subframes of the interfering cell are configured as ABS subframes co-existing with ABS-with-MBSFN subframes, in order to allow the corresponding subframes to all be used for the downlink measurement, the victim user equipment may designate and signal the downlink measurement to be performed only with respect to OFDM symbols having a constant interference amount, among the corresponding subframes. This method may be usefully used in RSSI measurement, wherein OFDM symbol power is measured. For example, referring to FIG. 19, the OFDM symbols maintaining a constant interference level, regardless of the subframe configuration of the interfering cell, correspond to OFDM symbol indexes 0, 1, 2, 3, 5, 6, 9, 10, 12, and 13 of the downlink subframe. Therefore, when the base station designates and signals the downlink measurement (e.g., RSSI measurement) to be performed by the user equipment by using only the corresponding OFDM symbols (OFDM symbol indexes 0, 1, 2, 3, 5, 6, 9, 10, 12, and 13), the measurement result may maintain a constant interference level regardless of the subframe configuration of the interfering cell. Also, the base station may designate and signal the downlink measurement to be performed by the user equipment by using only a portion (one or more) of the corresponding OFDM symbols (OFDM symbol indexes 0, 1, 2, 3, 5, 6, 9, 10, 12, and 13). In other words, downlink resources of the victim cell, which receive constant interference from the interfering cell, may be designated and signaled as downlink measurement objects of the victim user equipment.

Figure 20:
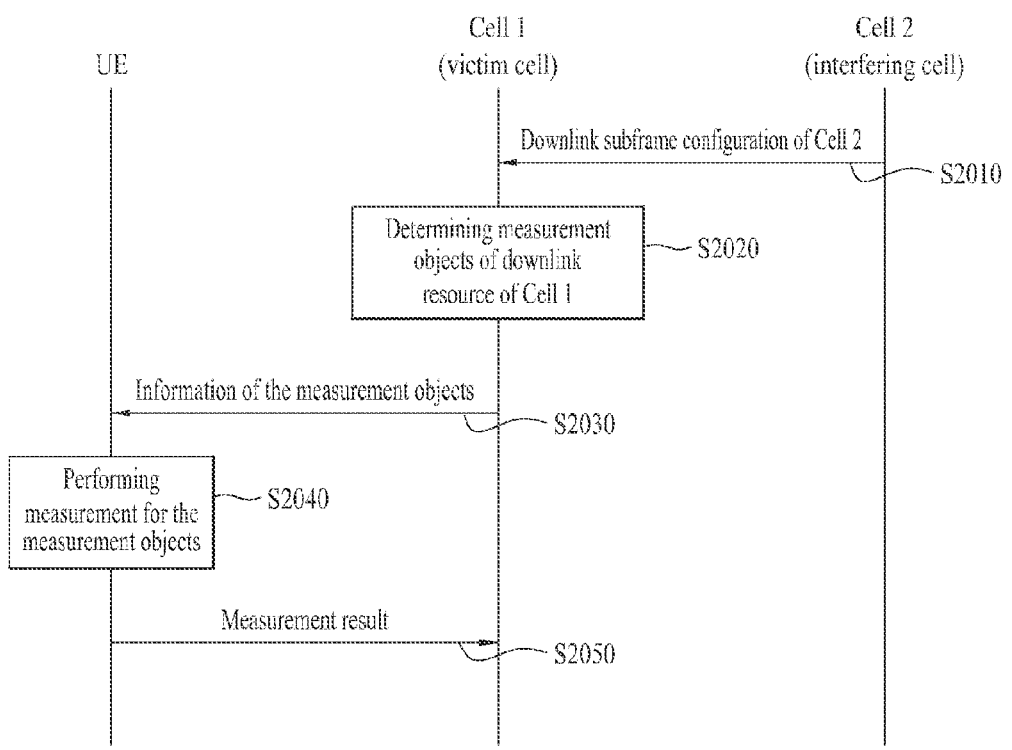
FIG. 20 illustrates a downlink measurement method of a user equipment with respect to an inter-cell interference coordination and a method for supporting the same according to an embodiment of the present invention.

FIG. 20 illustrates a downlink measurement method of a user equipment with respect to an inter-cell interference coordination and a method for supporting the same according to an embodiment of the present invention. Steps S2010, S2020, S2030, and S2050 may correspond to detailed process steps of a method for supporting downlink measurement of the user equipment in a $1^{st}$ cell, and steps S2030, S2040, and S2050 may correspond to detailed process steps of a method for performing downlink measurement of the user equipment in the $1^{st}$ cell. Hereinafter, each process step will be described in detail.

In the downlink measuring method and the measurement supporting method, which are described with reference to FIG. 20, it is assumed that 2 cells, i.e., a 1st cell and a 2nd cell, exchanging interference exist. Hereinafter, in the description of the present invention, it will be assumed that the 1st cell (or 1st base station) corresponds to the victim cell, and that the 2nd cell (or 2nd base station) corresponds to the interfering cell. Additionally, it will also be assumed that the user equipment corresponds to a victim user equipment being served by the 1st cell (victim cell) and being influenced by an interference caused by the 2nd cell (interfering cell).

In step S2010, the 1st cell may receive information on the downlink subframe configuration of the 2nd cell from the 2nd cell. Alternatively, in case the 2nd cell configures the downlink subframe in accordance with a pre-decided pattern, the 1st cell may implicitly acquire downlink configuration information of the 2nd cell without having to receive the corresponding information directly from the 2nd cell. Herein, the downlink subframe configuration information of the 2nd cell may correspond to information indicating whether each downlink subframe of the 2nd cell corresponds to a normal subframe, an ABS subframe, an MBSFN subframe, or an ABS-with-MBSFN subframe. Furthermore, the 1st cell may be informed of a downlink subframe timing of the 2nd cell through the downlink subframe configuration of the 2nd cell. Accordingly, the 1st cell may be informed of an offset degree by which downlink subframe boundaries of the 1st cell and the 2nd cell are shifted. As a result, among its own downlink resources (time, frequency, and/or space resources), the 1st cell may be aware of the resource that is being influenced by the interference caused from the 2nd cell.

In step S2020, based upon the information on the downlink subframe configuration of the 2nd cell, the 1st cell may determine the resources on which measurement is to be performed by the user equipment, i.e., the measurement objects, among the downlink resources of the 1st cell itself. More specifically, in deciding the measurement objects, the 1st cell may consider resource areas that are influenced by the interference occurring from the 2nd cell. For example, the 1st cell may determine resources that are not substantially actually influenced by the interference caused from the 2nd cell as the measurement objects. Alternatively, the 1st cell may also decide resources that experience constant interference from the 2nd cell as the measurement objects.

In step S2030, the base station may transmit information on the measurement objects to the user equipment. The information on the measurement objects may correspond to information specifying downlink resources of the 1st cell, which are designated to be measured by the user equipment. And, the information on the measurement objects may be transmitted to the user equipment via, for example, the RRC signaling. Information on the measurement objects may be expressed as a combination of at least one set of time resource information, for example, information indicating a certain downlink subframe, whether the resource corresponds to the control region or the data region, a certain slot, a certain OFDM symbol, and so on. Additionally, the information on the measurement objects may also be expressed as a combination of at least one of information on the time resource, information on the frequency resource (the corresponding RB), and information on the space resource (the corresponding antenna port). Accordingly, the 1st cell may notify the resource on which the user equipment is to perform downlink measurement in RE units.

In step S2040, the user equipment may perform measurement on the measurement objects that are designated by the 1st cell. The measurement performed by the user equipment may include all of the measurement for RLM, the measurement for CSI reporting, the measurement of interference, and the RRM measurement (measurement of RSRP, RSSI, and so on). Herein, the 1st cell may designate the measurement that is to be performed by the user equipment.

In step S2050, the user equipment may report the measurement result to the 1st cell. Also, by specifying the downlink resource on which the 1st cell and the user equipment actually perform communication, only the measurement result on the corresponding resources may be taken into consideration. Therefore, a more accurate and efficient measurement result may be provided, and unnecessary RLF may also be prevented. Accordingly, as compared to a case where inter-cell interference causes a large influence, measurement results, such as channel quality, may be more efficiently used.

In the downlink measurement method and the method for supporting measurement according to the present invention, which are described with reference to FIG. 20, details of the above-described various embodiments of the present invention may be independently applied or 2 or more embodiments may be applied at the same time. And, in this case, overlapping details will be omitted from the description for simplicity and clarity.

Figure 21:
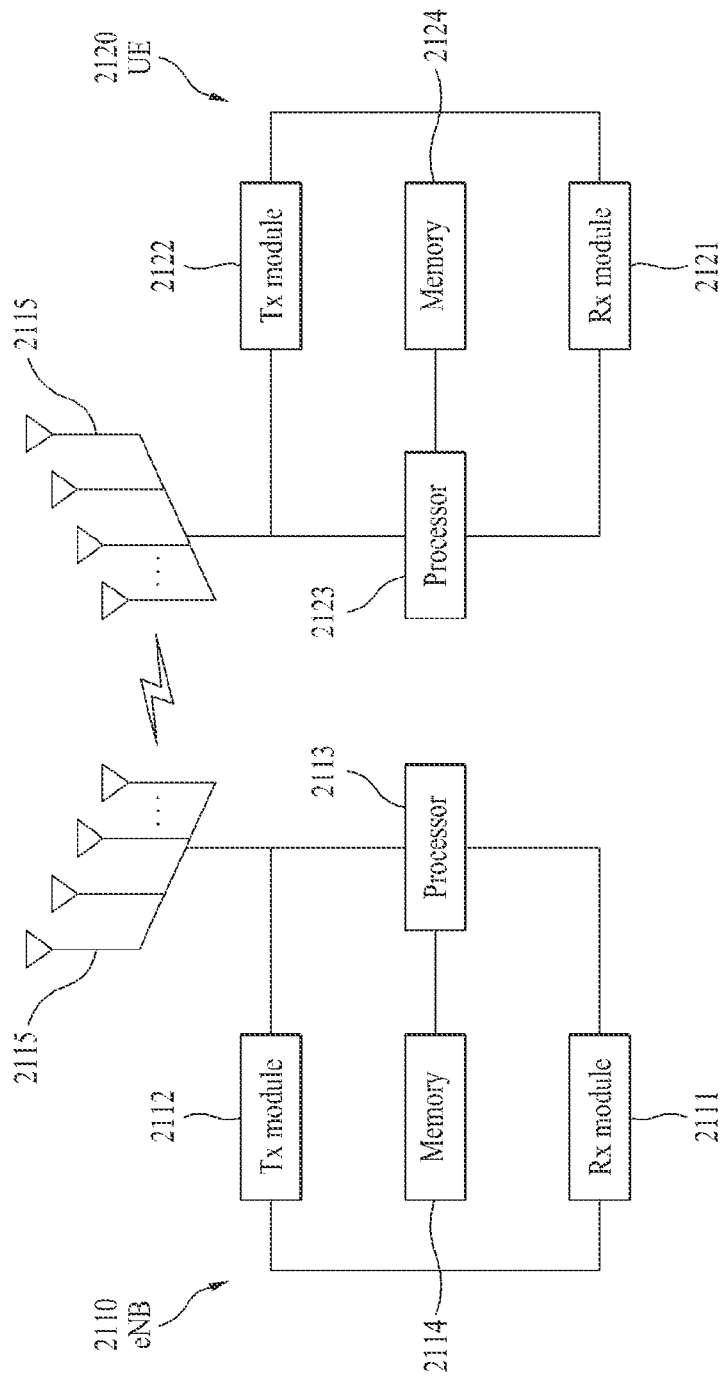
FIG. 21 illustrates a base station device and a user equipment device according to a preferred embodiment of the present invention.

FIG. 21 illustrates a base station device 2110 and a user equipment device 2120 according to a preferred embodiment of the present invention.

Referring to FIG. 21, the base station device 2110 according to the present invention may include a reception module 2111, a transmission module 2112, a processor 2113, a memory 2114, and a plurality of antennae 2115. The plurality of antennae 2115 indicates that the base station device supports MIMO transmission and reception. The reception module 2111 may receive various signals, data, and information on an uplink from the user equipment. The transmission module 2112 may transmit various signals, data, and information on a downlink to the user equipment. The processor 2113 may control the overall operations of the base station device 2110.

The base station device 2110 according to the embodiment of the present invention may be configured to support measurement of the user equipment device. The base station device 2110 may correspond to a base station that is influenced by an interference caused from another base station. The processor 2113 of the base station 2110 may be configured to acquire information on downlink subframe configuration of the base station causing the interference. Also, the processor 2113 may be configured to decide measurement objects among the downlink resources of the base station device 2110, based upon the downlink subframe configuration of the base station causing the interference. Additionally, the processor 2113 may be configured to transmit information on the decided measurement objects to the user equipment 2120 through the transmission module 2112. Furthermore, the processor 2113 may be configured to receive measurement results respective to the measurement objects from the user equipment 2120 through the reception module 2111.

Moreover, the processor 2113 of the base station device 2110 performs a calculation/operation process on information received by the base station device 2110, information that are to be transmitted outside, and so on. The memory 2114 may store the operated information for a predetermined period of time, and the memory 2114 may be replaced by another element, such as a buffer (not shown).

Referring to FIG. 21, the user equipment device 2120 according to the present invention may include a reception module 2121, a transmission module 2122, a processor 2123, a memory 2124, and a plurality of antennae 2125. The plurality of antennae 2125 indicates that the user equipment device supports MIMO transmission and reception. The reception module 2121 may receive various signals, data, and information on a downlink from the base station. The transmission module 2122 may transmit various signals, data, and information on an uplink to the base station. The processor 2123 may control the overall operations of the user equipment device 2120.

The user equipment device 2120 according to the embodiment of the present invention may be configured to perform measurement on a downlink from the base station device 2110. The user equipment device 2120 may correspond to a user equipment that is influenced by an interference caused from another base station. The processor 2123 of the user equipment device 2120 may be configured to receive information on measurement objects from the base station device 2110 through the reception module 2121. Also, the processor 2123 may be configured to perform measurement on the designated measurement and to transmit the measured results to the base station device 2110 through the transmission module 2122. Herein, the measurement objects may be decided among downlink resources of the base station device 2110, based upon the downlink subframe configurations of another base station causing interference.

Moreover, the processor 2123 of the user equipment device 2120 performs a calculation/operation process on information received by the user equipment device 2120, information that are to be transmitted outside, and so on. The memory 2124 may store the operated information for a predetermined period of time, and the memory 2124 may be replaced by another element, such as a buffer (not shown).

In the above-described detailed configuration of the base station device 2110 and the user equipment device 2120, details of the above-described various embodiments of the present invention may be independently applied or 2 or more embodiments may be applied at the same time. And, in this case, overlapping details will be omitted from the description for simplicity and clarity.

Furthermore, the description of the base station device 2110 of FIG. 21 may also be equally applied to a relay station device functioning as a downlink transmission subject or an uplink reception subject. And, the description of the user equipment device 2120 of FIG. 21 may also be equally applied to a relay station device functioning as an uplink transmission subject or a downlink reception subject.

The above-described embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

The embodiments of the present invention are applicable to various mobile communication systems.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for supporting measurement of a User Equipment (UE) by a first base station in a wireless communication system, the method comprising:
   receiving, from a second base station, downlink subframe configuration information indicating at least one subframe configured as an Almost Blank Subframe (ABS) by the second base station;
   transmitting, to the UE, information indicating a subframe for performing a measurement determined based on the downlink subframe configuration information; and
   receiving, from the UE, a report for the measurement performed over all Orthogonal Frequency Division Multiplexing (OFDM) symbols in the indicated subframe.

2. The method according to claim 1, wherein the information indicating the subframe for performing the measurement is transmitted through Radio Resource Control (RRC) signaling.

3. The method according to claim 1, wherein the downlink subframe configuration information is received through X2 signaling.

4. The method according to claim 1, wherein the measurement is for Reference Signal Received Quality (RSRQ), and the RSRQ is measured by Reference Signal Received Power (RSRP) and a Received Signal Strength Indicator (RSSI).

5. A method for performing measurement by a User Equipment (UE) in a wireless communication system, the method comprising:
   receiving, from a first base station, information indicating a subframe for performing a measurement, wherein the subframe is determined by the first base station based on information indicating at least one subframe configured as an Almost Blank Subframe (ABS) by a second base station;
   performing the measurement over all Orthogonal Frequency Division Multiplexing (OFDM) symbols in the indicated subframe; and
   transmitting, to the first base station, a report for the measurement.

6. The method according to claim 5, wherein the information indicating the subframe for performing the measurement is received through Radio Resource Control (RRC) signaling.

7. The method according to claim 5, wherein the information indicating the at least one subframe configured as the ABS is received to the first base station from, the second base station, through X2 signaling.

8. The method according to claim 5, wherein the measurement is for Reference Signal Received Quality (RSRQ), and the RSRQ is measured by Reference Signal Received Power (RSRP) and a Received Signal Strength Indicator (RSSI).

9. A first base station for supporting measurement of a User Equipment (UE), the first base station comprising:
   a reception module;
   a transmission module; and
   a processor configured to:
      receive, from a second base station, downlink subframe configuration information indicating at least one subframe configured as an Almost Blank Subframe (ABS) by the second base station, through the reception module,
      transmit, to the UE, information indicating a subframe for performing a measurement, determined based on the downlink subframe configuration information, through the transmission module, and
      receive, from the UE, a report for the measurement performed over all Orthogonal Frequency Division Multiplexing (OFDM) symbols in the indicated subframe, through the reception module.

10. A User Equipment (11E) for performing measurement, the UE comprising:
   a reception module;
   a transmission module; and
   a processor configured to:
      receive, from a first base station, information indicating a subframe for performing a measurement, wherein the subframe is determined by the first base station based on information indicating at least one subframe configured as an Almost Blank Subframe (ABS) by a second base station, through the reception modulo,
      perform the measurement over all Orthogonal Frequency Division Multiplexing (OFDM) symbols in the indicated subframe, and
      transmit, to the first base station, a report for the measurement, through the transmission module.

* * * * *